United States Patent
Anderson et al.

(10) Patent No.: US 11,685,509 B2
(45) Date of Patent: *Jun. 27, 2023

(54) INTEGRALLY STIFFENED BONDED PANEL WITH VENTED POCKETS AND METHODS OF MANUFACTURE

(71) Applicant: The Boeing Company, Chicago, IL (US)

(72) Inventors: David M. Anderson, Sammamish, WA (US); Jeffrey P. Baucum, Sammamish, WA (US)

(73) Assignee: THE BOEING COMPANY, Arlington, VA (US)

( * ) Notice: Subject to any disclaimer, the term of this patent is extended or adjusted under 35 U.S.C. 154(b) by 341 days.

This patent is subject to a terminal disclaimer.

(21) Appl. No.: 16/882,964

(22) Filed: May 26, 2020

(65) Prior Publication Data
US 2021/0221493 A1    Jul. 22, 2021

Related U.S. Application Data

(63) Continuation-in-part of application No. 16/658,738, filed on Oct. 21, 2019, now Pat. No. 11,554,561.

(51) Int. Cl.
| B64C 3/26 | (2006.01) |
| B29D 99/00 | (2010.01) |
| B32B 3/30 | (2006.01) |
| B32B 27/38 | (2006.01) |
| B29K 63/00 | (2006.01) |
| B29K 307/04 | (2006.01) |
| B29L 31/30 | (2006.01) |

(52) U.S. Cl.
CPC ............ *B64C 3/26* (2013.01); *B29D 99/0025* (2013.01); *B32B 3/30* (2013.01); *B32B 27/38* (2013.01); *B29K 2063/00* (2013.01); *B29K 2307/04* (2013.01); *B29L 2031/3085* (2013.01); *B32B 2250/02* (2013.01); *B32B 2260/021* (2013.01); *B32B 2260/046* (2013.01); *B32B 2262/106* (2013.01); *B32B 2605/18* (2013.01)

(58) Field of Classification Search
CPC ........................................................ B64C 3/26
See application file for complete search history.

(56) References Cited

U.S. PATENT DOCUMENTS

| 3,265,556 | A | 8/1966 | Hungerford et al. |
| 4,934,580 | A | 6/1990 | Sutton |
| 6,358,590 | B1 | 3/2002 | Blair et al. |
| 7,097,731 | B2 | 8/2006 | Puriefoy et al. |
| 11,338,903 | B2 * | 5/2022 | Anderson ............... B32B 3/266 |

(Continued)

FOREIGN PATENT DOCUMENTS

EP    2263863 A2    12/2010

OTHER PUBLICATIONS

European Search Report dated Mar. 6, 2021 for corresponding EP application.

*Primary Examiner* — Jeffry H Aftergut
(74) *Attorney, Agent, or Firm* — Coats & Bennett, PLLC

(57) ABSTRACT

Methods, systems, and apparatuses are disclosed for the manufacture of composite components having incorporated reinforcing structures machined into composite material substrates, and composite components manufactured according to disclosed methods, and assemblies and larger structures comprising the composite material components.

13 Claims, 18 Drawing Sheets

(56) References Cited

U.S. PATENT DOCUMENTS

| | | |
|---|---|---|
| 2007/0166581 A1 | 7/2007 | Terazaki et al. |
| 2012/0040159 A1 | 2/2012 | Pechnik |
| 2016/0168441 A1 | 6/2016 | Maisonnave et al. |
| 2017/0306466 A1 | 10/2017 | Meyer et al. |
| 2018/0281923 A1* | 10/2018 | Walker ................... B64C 3/26 |
| 2020/0101690 A1 | 4/2020 | Oishi et al. |

* cited by examiner

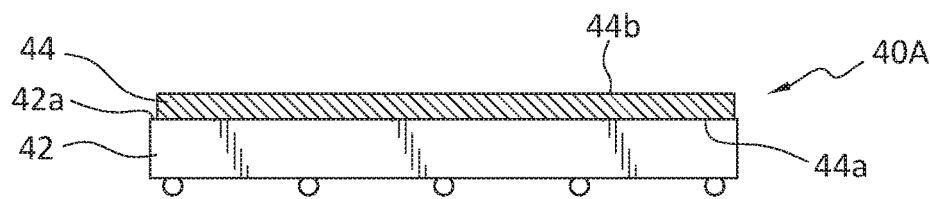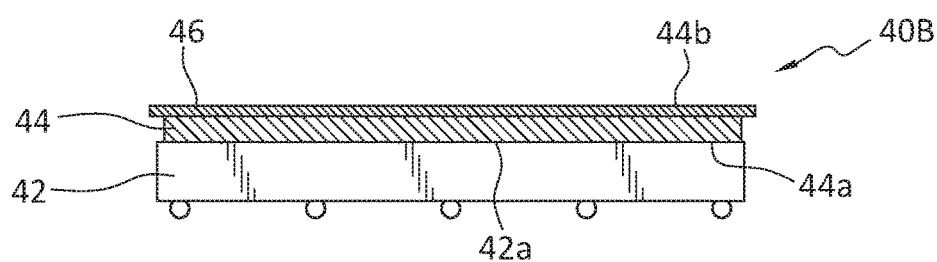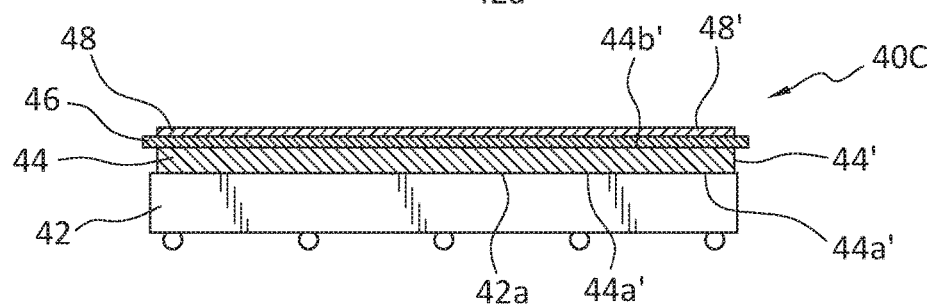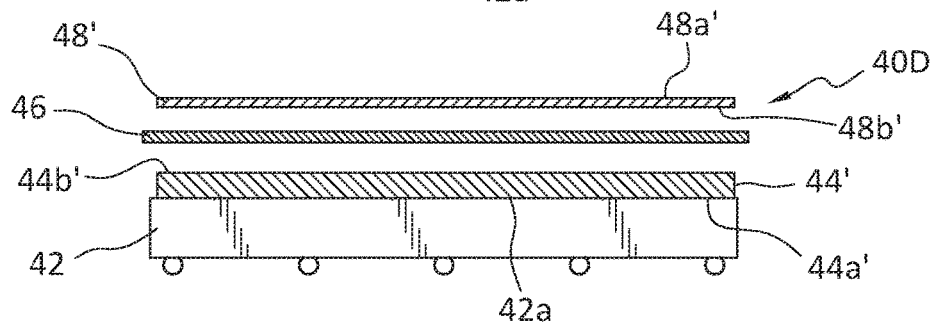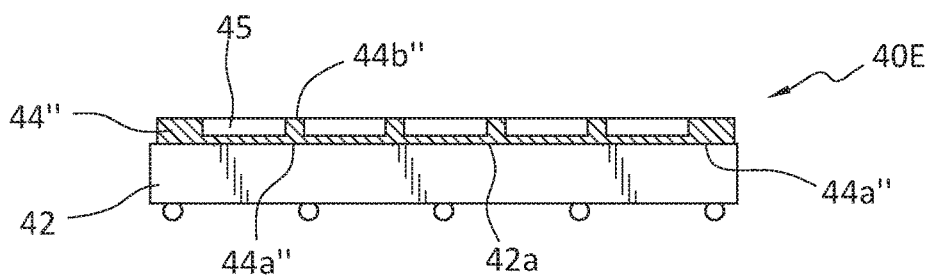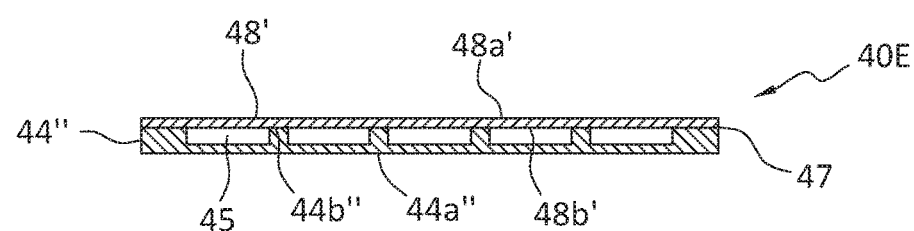

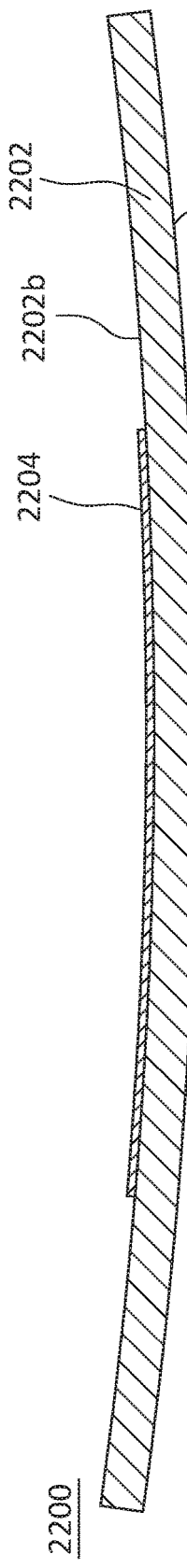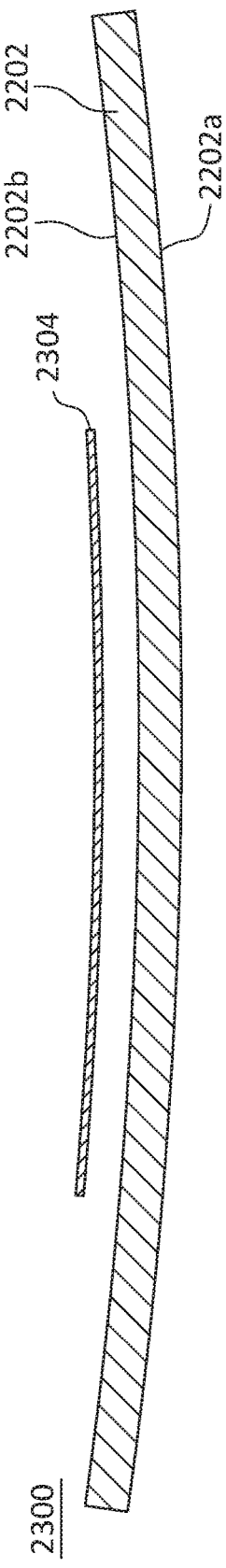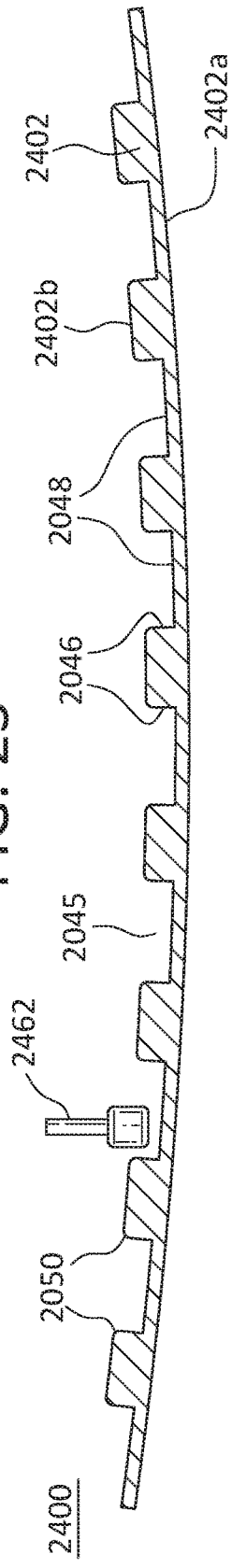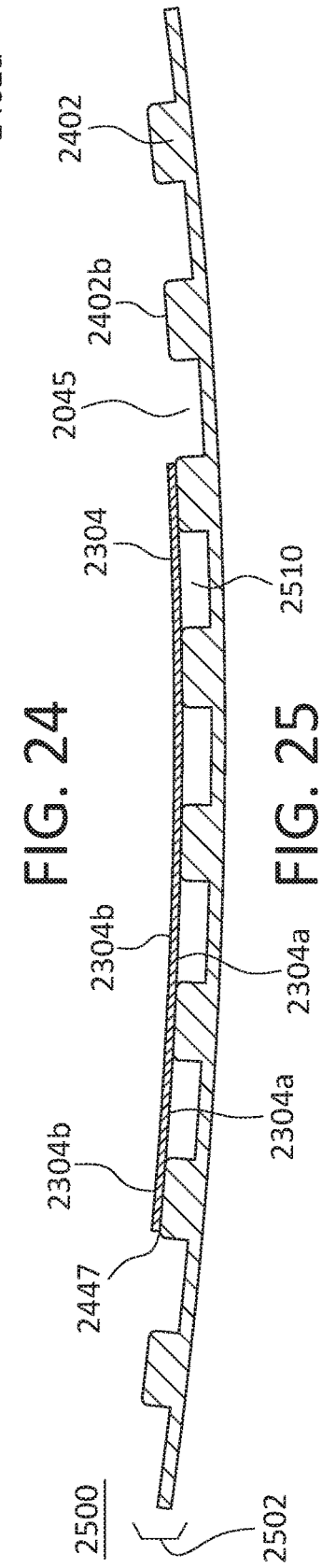

INTEGRALLY STIFFENED BONDED PANEL WITH VENTED POCKETS AND METHODS OF MANUFACTURE

RELATED APPLICATIONS

This application is a continuation-in-part of U.S. patent application Ser. No. 16/658,738, filed Oct. 21, 2019, the disclosure of which is incorporated by reference herein in its entirety as if made part of the present application.

TECHNOLOGICAL FIELD

The present disclosure relates generally to the field of composite materials and structures and components made from composite materials. More specifically the present disclosure relates to the field of machining composite materials for use as composite material components, and manufacturing composite components using the machined composite materials.

BACKGROUND

Aircraft structures, including, for example, wing structures typically include a complex assembly that includes stringer, rib, spars, etc. as reinforcement structures in the interior of the wing assembly. Ribs are typically spatially arranged perpendicularly along the longitudinal length of the wing interior. Stringers are typically connected to the wing skin, with ribs and spars connected to stringer assemblies to form a reinforced wing box assembly with desired strength and rigidity. The stringers typically extend along the longitudinal length of the wing interior.

Aircraft wings constructed with reinforcing stingers, ribs, spars, fasteners, etc. are costly on a component level, and can further increase overall cost of a wing assembly process, and further increase the overall cost of structures incorporating such components and assemblies. Further, interior wing components that are typically used as wing reinforcements, and the fasteners used to connect the reinforcements add considerable weight to the wing assembly and add to the overall weight of the aircraft comprising such wing assemblies.

SUMMARY

According to a present aspect a method is disclosed including orienting a plurality of composite material layers onto a tool to form a composite material substrate, with the composite material substrate having a composite material substrate thickness, and with the tool having a tooling surface. The composite material substrate further includes a composite material substrate first surface and a composite material substrate second surface, with the composite material substrate first surface positioned proximate to the tooling surface, and with the composite material substrate further including a composite material substrate first or "front" edge and a composite material substrate second or "back" edge. The composite material substrate first edge further comprises a composite material substrate first edge entry, and the composite material substrate second edge further comprises a composite material substrate second edge entry. The method further includes orienting a separator layer proximate to the composite material substrate second surface; orienting a composite material top layer onto the separator layer; and at least partially curing the composite material substrate and the composite material top layer. The method further includes separating the at least partially cured composite material top layer from the at least partially cured composite material substrate. The method further includes orienting a composite material removal device proximate to the composite material substrate second surface, and machining at least one recess into the composite material substrate and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface.

In another aspect, the step of machining at least one recess into the composite material further includes machining a plurality of recesses into the composite material substrate.

In another aspect, the method further includes machining a plurality of channels into the composite material substrate, with at least one of the plurality of channels interconnecting at least one of the plurality of recesses.

In another aspect, at least one of the plurality of channels extends from a recess to at least one of the composite material substrate first edge the composite material substrate second edge, or another recess.

In a further aspect, at least one of the plurality of recesses is in communication with at least one of the composite material substrate first edge, the composite material substrate second edge, and another recess.

In another aspect, the recess is configured to include a predetermined geometric profile that can include at least one of a rectangle, a circle, an ellipse, a triangle, a polygon, an irregular shape, or combinations thereof.

In a further aspect, the predetermined distance the recess extends into the machined composite material substrate thickness is equal to from about 50% to about 80% of the composite material substrate thickness.

In another aspect, the predetermined distance the recess extends into the machined composite material substrate thickness is equal to from about 65% of the composite material substrate thickness.

According to a present aspect a method is disclosed including orienting a plurality of composite material layers onto a tool to form a composite material substrate, with the composite material substrate having a composite material substrate thickness, and with the tool having a tooling surface. The composite material substrate further includes a composite material substrate first surface and a composite material substrate second surface, with the composite material substrate first surface positioned proximate to the tooling surface. The method further includes orienting a separator layer device proximate to the composite material substrate second surface and orienting a composite material top layer onto the separator layer, and at least partially curing the composite material substrate and the composite material top layer. The method further includes separating the at least partially cured composite material top layer from the at least partially cured composite material substrate. The method further includes orienting a composite material removal device proximate to the composite material substrate second surface, and machining at least one recess into the composite material substrate and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface. A method further includes applying an adhesive material or other bonding agent to at least one of a composite material top layer or the machined composite material substrate second surface, orienting the composite material top layer onto the machined composite material substrate second surface, and bonding the composite material top layer to the machined composite material substrate second surface.

In another aspect, the method further includes machining a plurality of channels into the composite material substrate, with a predetermined number of said plurality of channels (greater than or equal to one) interconnecting a predetermined number (greater than or equal to two) of the plurality of recesses. The plurality of recesses and the plurality of channels forming a plurality of cavities in the composite material substrate interior, said cavities including a plurality of pathways.

In another aspect, the plurality of pathways interconnect a plurality of recesses.

In another aspect at least one channel is machined into the composite material substrate extending from at least one recess to at least one edge of the composite material substrate, with the channel placing at least one recess in communication with a composite material substrate exterior at the composite material substrate exterior entry point.

In a further aspect, the composite material interior is in communication with at least one composite material exterior entry point.

In another aspect, the method includes sealing at least one composite material substrate entry point, and providing a negative pressure to the cavities, and curing the composite material substrate.

In a further aspect, the curing does not include vacuum bag curing of the composite material substrate.

In a further aspect, a method includes equalizing pressure in at least one recess to an ambient pressure, with the ambient pressure equal to the pressure present at the composite material substrate exterior.

In another aspect, a method includes equalizing a composite material substrate cavity pressure with the composite material substrate exterior pressure, with the composite material substrate exterior pressure equal to the ambient pressure.

In another aspect, a predetermined number of channels (greater than or equal to one) extend from a recess to the composite material substrate first edge or the composite material substrate second edge.

In a further aspect, at least one of the plurality of recesses is in communication with at least one of: the composite material substrate first edge, the composite material substrate second edge, and another recess.

In a further aspect, in presently disclosed methods the material removal device is a laser.

In another aspect, in presently disclosed methods the material removal device is a CNC device including, for example, a CNC milling machine, etc.

In another aspect, in presently disclosed methods the material removal device is in communication with a controller.

In a further aspect, the plurality of recesses is machined into the composite substrate material in a predetermined pattern.

In another aspect, a plurality of recesses is machined into the composite material substrate, that can include machining the plurality of recesses into the composite material substrate in a predetermined pattern.

In another aspect, a component is disclosed, with the component including a material substrate that can be a composite material substrate or a metal material substrate, with the material substrate including a material substrate first surface, a material substrate second surface, and a material substrate thickness extending from the material substrate first surface, a material substrate second surface. The material substrate second surface is configured to comprise at least one recess, with the recess configured to extend from the material substrate second surface to a predetermined distance into the material substrate thickness from the material substrate second surface to form a machined material substrate, and with the machined material substrate including a machined material substrate first surface and a machined material substrate second surface. The material substrate further includes a material substrate first edge (that can be a "front" edge) and a material substrate second edge (that can be a "back" edge). The material substrate further includes a plurality of channels configured to extend from the material substrate second surface to a predetermined distance into the material substrate thickness from the material substrate second surface, with at least one of said plurality of channels interconnecting at least one of the plurality of recesses.

In another aspect, at least one of the plurality of channels extends from a recess to at least one of the material substrate first edge, the material substrate second edge and another recess.

In a further aspect, at least one of the plurality of recesses is in communication with at least one of: the composite material substrate first edge, the composite material substrate second edge, and another recess.

The component further includes a top layer material bonded to the machined material substrate second surface, and wherein, a plurality of recesses and at least one channel is configured to be bounded by surrounding material substrate and the top layer material to form an internal pathway in the machined material substrate.

In another aspect, the machined material substrate includes a machined material substrate interior, with the machined material substrate interior having a machined material substrate interior pressure and further including a machined material substrate exterior, the machined material substrate exterior exposed to a machined material substrate exterior pressure, with the machined material substrate exterior pressure substantially equivalent to an ambient pressure.

In a further aspect, the composite component includes an adhesive layer disposed between the machined material substrate second surface and the top layer material.

In another aspect, at least one of the material substrate and the top layer material includes a composite material.

In another aspect, at least one of the material substrate and the top layer material includes a fiber-containing epoxy-based composite material.

In another aspect, at least one of the material substrate and the top layer material includes a carbon fiber-containing epoxy-based composite material.

In another aspect, at least one of the material substrate and the top layer material includes a metal.

In another aspect, at least one of the material substrate and the top layer material includes a 2000 series or a 7000 series aluminum alloy.

In another aspect, the plurality of material substrate internal pathways interconnect a plurality of recesses.

In another aspect at least one channel is machined into the material substrate extending from at least one recess to at least one edge of the material substrate, with the channel placing at least one recess in communication with a material substrate exterior at the composite material substrate exterior entry point In another aspect, a predetermined number of channels (greater than or equal to one) extend from a recess to the material substrate first edge or extend from a recess to the material substrate second edge.

In a further aspect, at least one of the plurality of recesses is in communication with at least one of: the material substrate first edge, the material substrate second edge, and another recess.

In another aspect, the plurality of channels in the composite material substrate interconnect a predetermined number (greater than or equal to one) of the plurality of recesses. The plurality of recesses and the plurality of channels are configured to form a plurality of internal pathways in the material substrate.

In another aspect, the pressure within the recesses is equivalent to an ambient pressure, with the ambient pressure equal to the pressure present at the material substrate exterior.

In another aspect, the pressure within the recesses is different from an ambient pressure, with the ambient pressure equal to the pressure present at the material substrate exterior.

Another present aspect discloses a structure that can be a vehicle, such as, for example, an aircraft, with the aircraft including a component that includes a material substrate, that can be a composite material substrate or a metal material substrate, with the material substrate including a material substrate first surface, a material substrate second surface, and a material substrate thickness extending from the material substrate first surface, a material substrate second surface. The material substrate second surface is configured to comprise at least one recess, with the recess configured to extend from the material substrate second surface to a predetermined distance into the material substrate thickness from the material substrate second surface to form a machined material substrate, and with the machined material substrate including a machined material substrate first surface and a machined material substrate second surface. The material substrate further includes a material substrate first edge (that can be a "front" edge) and a material substrate second edge (that can be a "back" edge). The material substrate further includes a plurality of channels configured to extend from the material substrate second surface to a predetermined distance into the material substrate thickness from the material substrate second surface, with at least one of the plurality of channels interconnecting at least one of the plurality of recesses.

The component further includes a top layer material adhered or bonded to the machined material substrate second surface, and wherein, the recess is configured to be bounded by surrounding material substrate and the top layer material.

In another aspect, the structure can be a vehicle including at least one of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; and combinations thereof.

A further present aspect discloses a wing assembly including a material substrate that can include a composite material substrate or include a metal material substrate, with the material substrate including a material substrate first surface, a material substrate second surface, and a material substrate thickness extending from the material substrate first surface, a material substrate second surface. The material substrate second surface is configured to comprise at least one recess, with the recess configured to extend from the material substrate second surface to a predetermined distance into the material substrate thickness from the material substrate second surface to form a machined material substrate, and with the machined material substrate including a machined material substrate first surface and a machined material substrate second surface. The material substrate further includes a material substrate first edge (that can be a "front" edge) and a material substrate second edge (that can be a "back" edge). The material substrate further includes a plurality of channels configured to extend from the material substrate second surface to a predetermined distance into the material substrate thickness from the material substrate second surface, with at least one of the plurality of channels interconnecting at least one of the plurality of recesses.

The wing assembly further includes a composite top layer material adhered or bonded to the machined material substrate second surface, and wherein, the recesses and channels are configured to be bounded by surrounding material substrate and the top layer material to form an internal pathway.

In another aspect, the presently disclosed wing assembly includes an inner wing skin including the disclosed machined composite material substrate.

In another aspect, the presently disclosed wing assembly includes an outer wing skin in the form of the presently disclosed composite material top layer, with the outer wing skin adhered or bonded to the inner wing skin to form a wing assembly, with the inner wing skin including the disclosed machined composite material substrate.

In another aspect, the wing assembly includes a plurality of recesses in the composite material substrate.

According to a present aspect a method is disclosed including orienting a metal substrate, with the metal substrate including a metal substrate first surface and metal substrate second surface, and with the metal substrate further including a metal substrate first or "front" edge and a metal substrate second or "back" edge. The metal substrate first edge further comprises a metal substrate first edge entry, and the metal substrate second edge further comprises a metal substrate second edge entry. The method further includes orienting a material removal device proximate to the metal substrate second surface, and machining at least one recess into the metal substrate and removing a predetermined amount of material from the metal substrate to form a recess in the metal substrate, with the recess configured to extend from the metal substrate second surface to a predetermined distance into the metal substrate thickness to form a machined metal substrate, and with the machined metal substrate comprising a machined metal substrate first surface and a machined metal substrate second surface.

In another aspect, the step of machining at least one recess into the metal substrate further includes machining a plurality of recesses into the metal substrate.

In another aspect, the method further includes machining a plurality of channels into the metal substrate, with at least one of the plurality of channels interconnecting at least one of the plurality of recesses.

In another aspect, a predetermined number of channels (greater than or equal to one) extend from a recess to the metal substrate first edge or the metal substrate second edge.

According to present aspects, a method further includes applying an adhesive material or other bonding agent to at least one of a top layer or the machined composite material substrate second surface, orienting the top layer onto the metal substrate second surface, and bonding the top layer to the machined composite material substrate second surface. According to this aspect, the top layer comprises a composite material or a metal.

In another aspect, the plurality of recesses and the plurality of channels form a plurality of cavities in the metal substrate interior, with the cavities including a plurality of pathways.

In another aspect, the plurality of pathways interconnect a plurality of recesses.

In another aspect at least one channel is machined into the metal substrate extending from a at least one recess to at least one edge of the metal substrate, with the channel placing at least one recess in communication with a metal substrate exterior at the metal substrate exterior entry point.

In a further aspect, the metal substrate interior is in communication with at least one metal substrate exterior entry point.

In another aspect, the method includes sealing at least one metal substrate entry point, and providing a negative pressure to the cavities, and, when the top layer material is a curable composite material, curing the composite top layer material.

In a further aspect, the curing does not include vacuum bag curing of the composite material top layer.

In a further aspect, a method includes equalizing pressure in at least one recess to an ambient pressure, with the ambient pressure approximately equal to the pressure present at the metal substrate exterior.

In another aspect, a method includes equalizing a metal substrate internal pathway pressure with the metal substrate exterior pressure, with the metal substrate exterior pressure approximately equal to the ambient pressure.

In another aspect, at least one channel extends from a recess to at least one of the metal substrate first edge, the metal substrate second edge, and another recess.

In a further aspect, at least one of the plurality of recesses is in communication with at least one of: the metal substrate first edge, the metal substrate second edge, and another recess.

In a further aspect, in presently disclosed methods the material removal device is a metal material removal device that can be a laser, a CNC device including, for example, a CNC milling machine, etc.

In another aspect, in presently disclosed methods the metal removal device is in communication with a controller.

In a further aspect, the plurality of recesses is machined into the metal substrate in a predetermined pattern.

In another aspect, a plurality of recesses is machined into the metal substrate, that can include machining the plurality of recesses into the metal substrate in a predetermined pattern.

A further present aspect is directed to a composite component, with the composite component including a first composite material substrate, with the first composite material substrate including a first composite material thickness, a first composite material substrate first surface, with the first composite material first surface comprising an outer mold line, and a first composite material substrate second surface, with the first composite material second surface configured to comprise at least one recess, with the at least one recess configured to extend from the first composite material second surface to a predetermined distance into the composite material substrate thickness from the first composite material substrate second surface. The composite component further includes a composite material layer bonded to the first composite material substrate second surface, with the composite material layer dimensioned to cover the at least one recess to form an internal pathway in the component, and wherein said internal pathway is bounded by the first composite material substrate and the composite material layer.

In another aspect, the composite component includes a plurality of recesses in the first composite material substrate.

In another aspect, the composite component includes a plurality of channels in the first composite material substrate, with the plurality of channels configured to interconnect at least two of the plurality of recesses.

In a further aspect, the internal pathway comprises the plurality of recesses and the plurality of channels.

In another aspect, the composite component includes an adhesive layer disposed between the first composite material substrate second surface and the composite material layer.

In another aspect, at least one of the first composite material substrate and the composite material layer includes a fiber-containing epoxy-based composite material.

In another aspect, in the composite component, at least one of the composite material substrate and the composite material layer includes a carbon fiber-containing epoxy-based composite material.

In another aspect, the composite component is a skin panel that can include an outer mold line.

In another aspect, a wing assembly includes the composite component.

In a further aspect, a fuel tank includes the composite component.

Another further aspect is directed to an aircraft including a composite component, with the composite component including a first composite material substrate, with the first composite material substrate including a first composite material substrate first surface, with the first composite material first surface comprising an outer mold line, and a first composite material substrate second surface, with the first composite material second surface configured to comprise at least one recess, with the at least one recess configured to extend from the first composite material second surface to a predetermined distance into the composite material substrate thickness from the first composite material substrate second surface. The composite component further includes a composite material layer bonded to the first composite material substrate second surface, with the composite material layer dimensioned to cover the at least one recess to form an internal pathway in the component, and wherein said internal pathway is bounded by the first composite material substrate and the composite material layer.

Another present aspect is directed to a method for forming a component material, with the method including orienting a plurality of composite material layers onto a tool to form a first composite material substrate, with the first composite material substrate having a first composite material substrate thickness, and with the tool including a tooling surface. The first composite material substrate further includes a first composite material substrate first surface, with the first composite material substrate first surface positioned in contact with the tooling surface. The first composite material substrate further includes a first composite material substrate second surface. The method further includes at least partially curing the first composite material substrate, and machining at least one recess into the first composite material substrate second surface, with the at least one recess configured to extend from the first composite material second surface to a predetermined distance into the first composite material substrate thickness to form a machined composite material substrate. The machined composite material substrate includes a machined composite material substrate first surface and a machined composite material substrate second surface, with the at least one recess including a recess perimeter located at the machined composite substrate material second surface.

The method further includes providing a second composite material layer, with the second composite material layer including a second composite material layer first surface and a second composite material layer second surface. The method further includes applying an adhesive material to at least one of the machined composite substrate material second surface, the recess perimeter, and the second composite material layer first surface. The method further includes orienting the second composite material layer first surface onto the machined composite material substrate second surface, and bonding the second composite material layer to the machined composite material substrate second surface to form a composite material component, with the component comprising at least one internal pathway, wherein at least one internal pathway is bounded by the machined composite material substrate and the second composite material layer first surface.

In another aspect, the tooling surface comprises an outer mold line dimension, with the method further including transferring the outer mold line dimension from the tooling surface to the first composite material substrate first surface.

In another aspect, the machined composite material substrate comprises a plurality of recesses In a further aspect, the method further includes machining at least one channel into the first composite material substrate second surface, with the at least one channel intersecting the at least two recesses.

In another aspect, the plurality of recesses are machined into the first composite material substrate in a predetermined pattern.

In another aspect, the internal pathway comprises at least one channel intersecting at least two recesses.

In another aspect, the structure can be a vehicle including at least one of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; and combinations thereof.

A further present aspect discloses a wing assembly including a composite material substrate including a composite material substrate first surface and a composite material substrate second surface, with the composite material second surface configured to comprise at least one recess, said recess configured to extend from the composite material second surface to a predetermined distance into the composite material substrate from composite material substrate second surface to form a machined composite material substrate, and with the machined composite material substrate including a machined composite material substrate first surface and a machined composite material substrate second surface. The component further includes a composite material top layer adhered or bonded to the machined composite material substrate second surface, and wherein, the recess is configured to be bounded by surrounding composite material substrate and the composite material top layer.

In another aspect, the presently disclosed wing assembly includes an inner wing skin including the disclosed machined composite material substrate.

In another aspect, the presently disclosed wing assembly includes an outer wing skin in the form of the presently disclosed composite material top layer, with the outer wing skin adhered or bonded to the inner wing skin to form a wing assembly, with the inner wing skin including the disclosed machined composite material substrate.

In another aspect, the wing assembly includes a plurality of recesses in the composite material substrate.

The composite material further includes a composite material first or "front" edge and a composite material second or "back" edge, and a plurality of channels into the composite material substrate, with a predetermined number of said plurality of channels (greater than or equal to one) interconnecting a predetermined number (greater than or equal to two) of the plurality of recesses.

In another aspect, a predetermined number of channels (greater than or equal to one) extend from a recess to the composite material first edge or the composite material second edge.

In a further aspect, at least one of the plurality of recesses is in communication with at least one of: the composite material first edge, the composite material second edge, and another recess.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1:
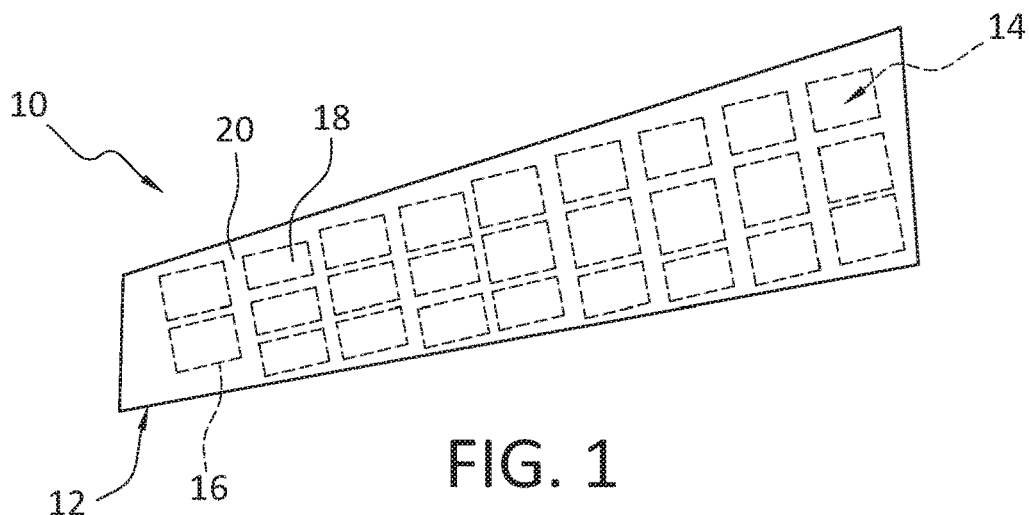
Figure 2A:
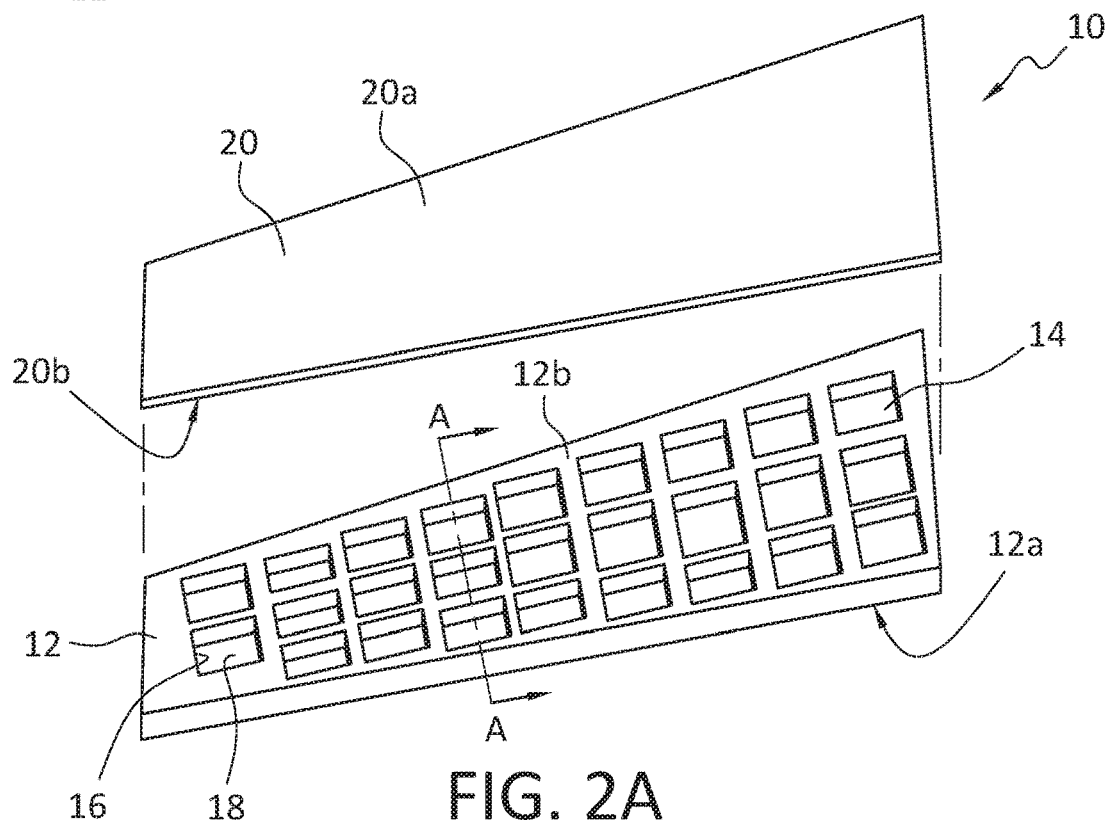
Figure 2B:
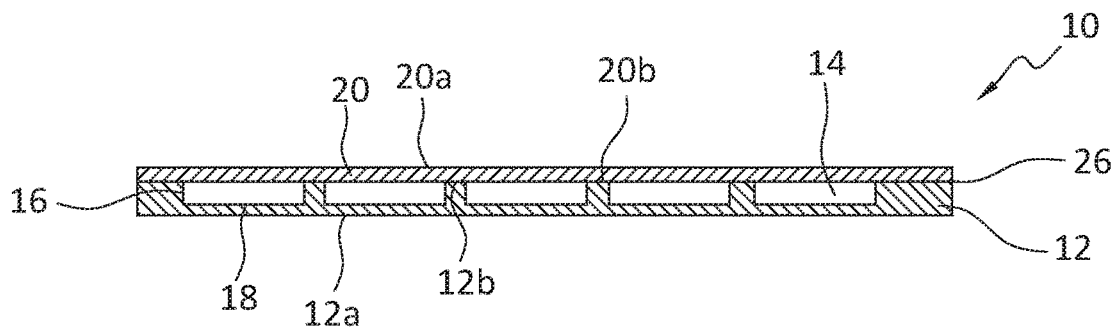
Figure 3:
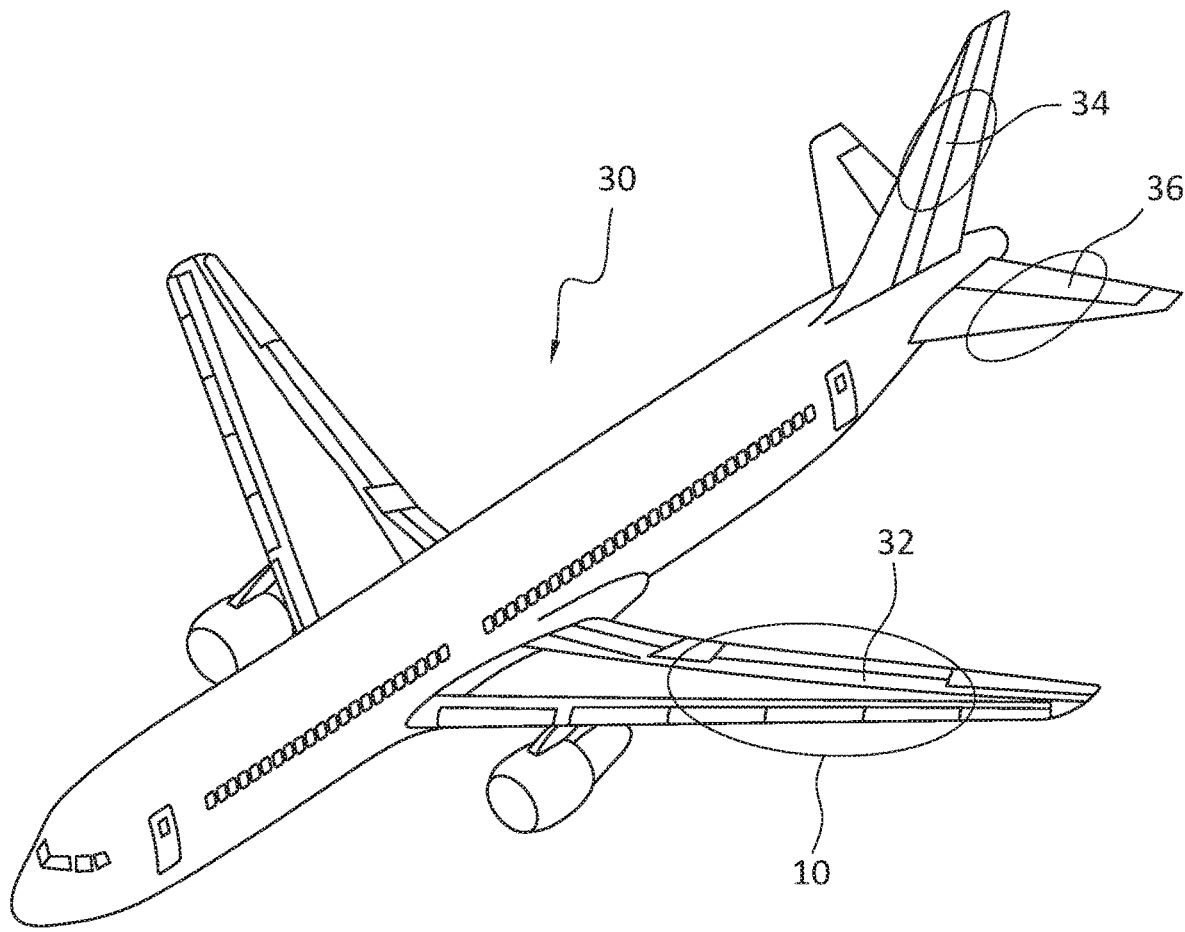
Figure 4G:
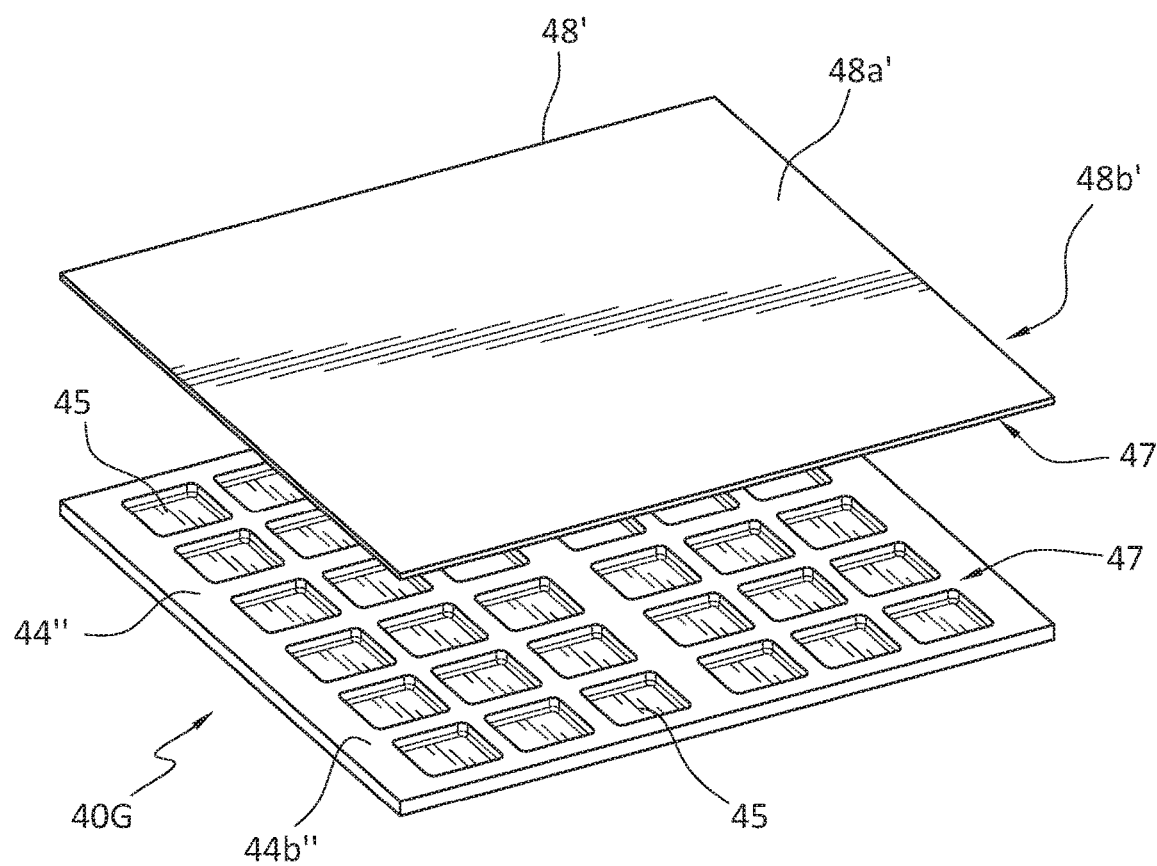
Figure 5:
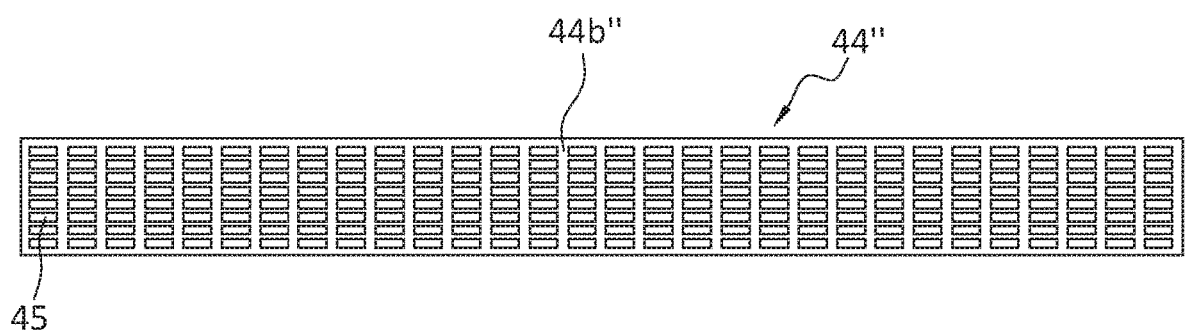
Figure 6A:
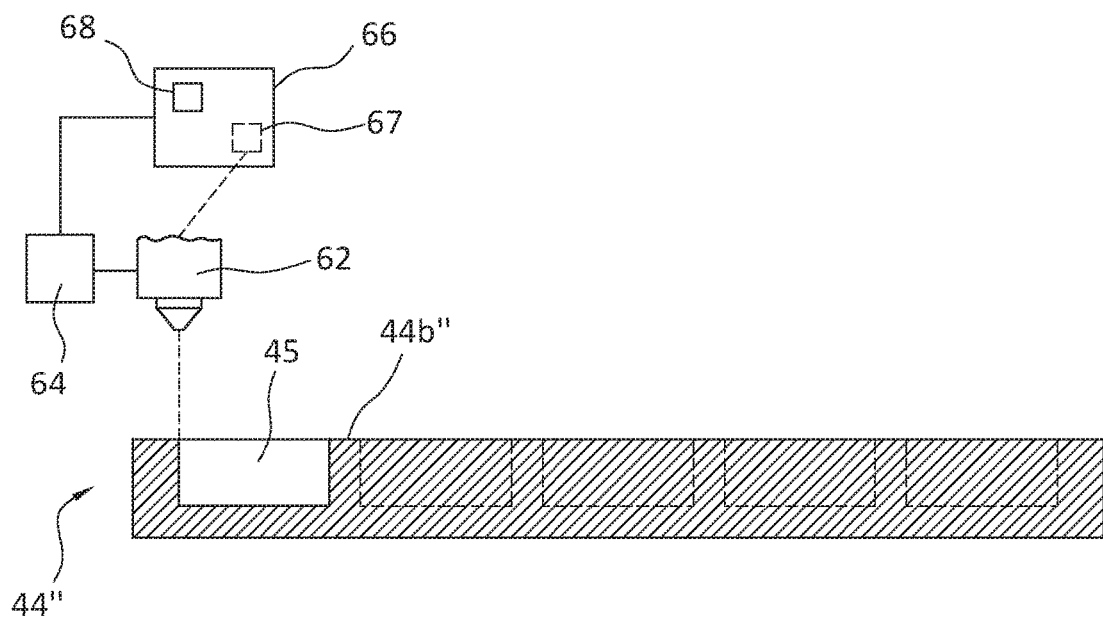
Figure 6B:
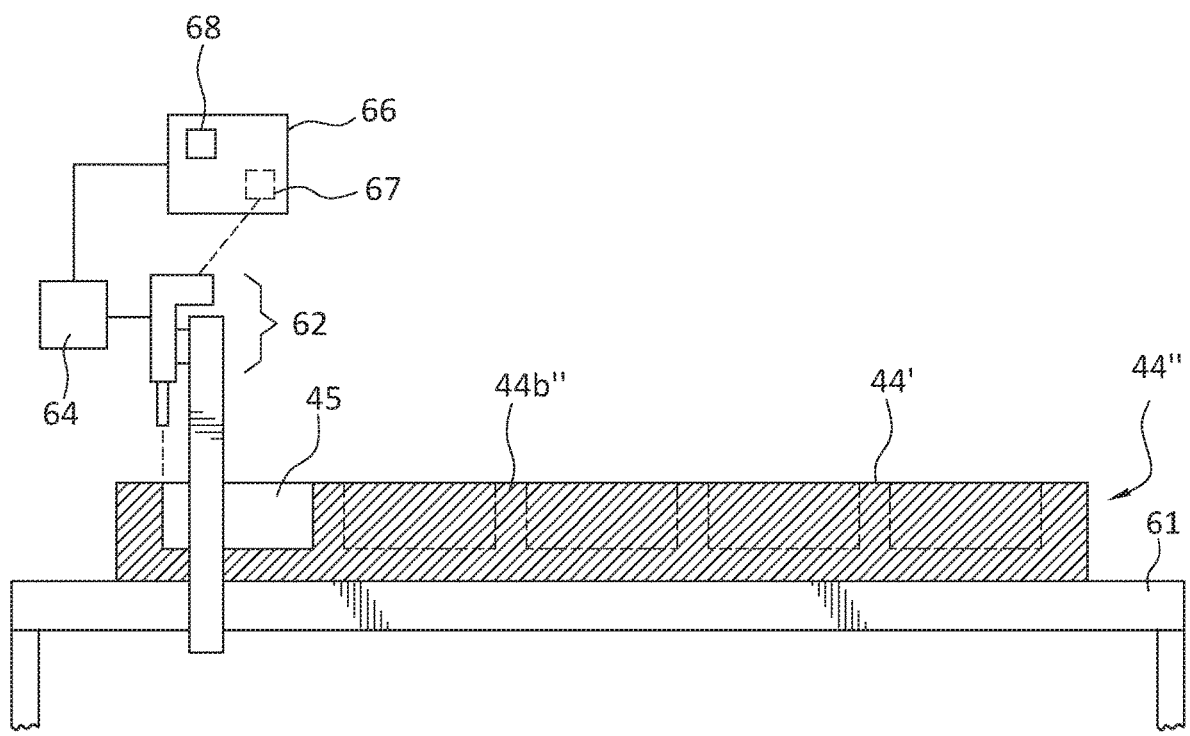
Figure 6C:
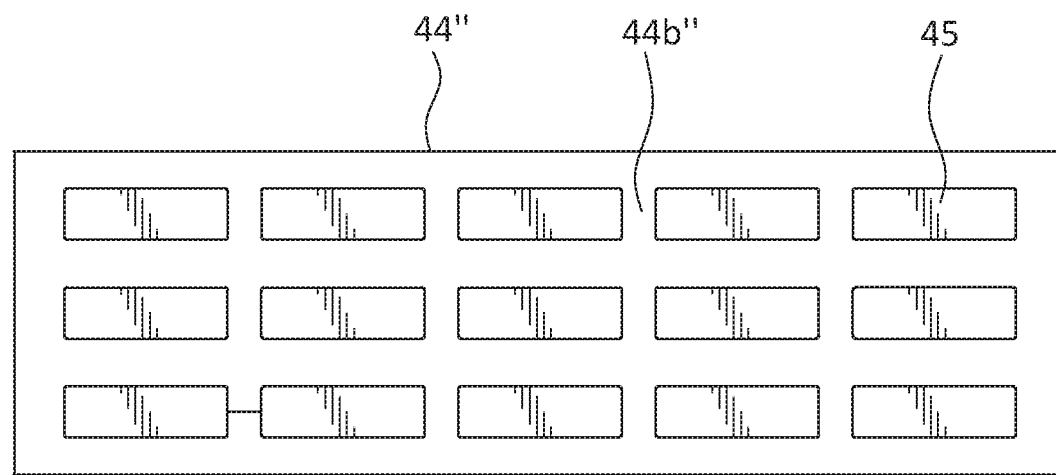
Figure 6D:
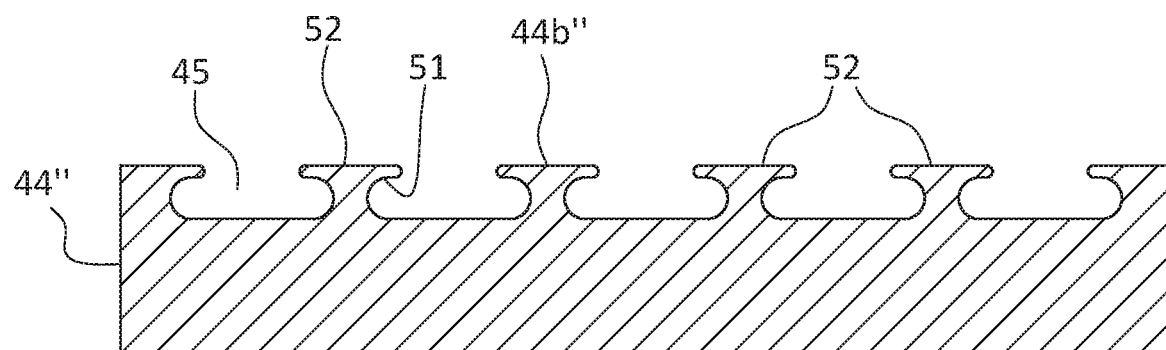
Figure 6E:
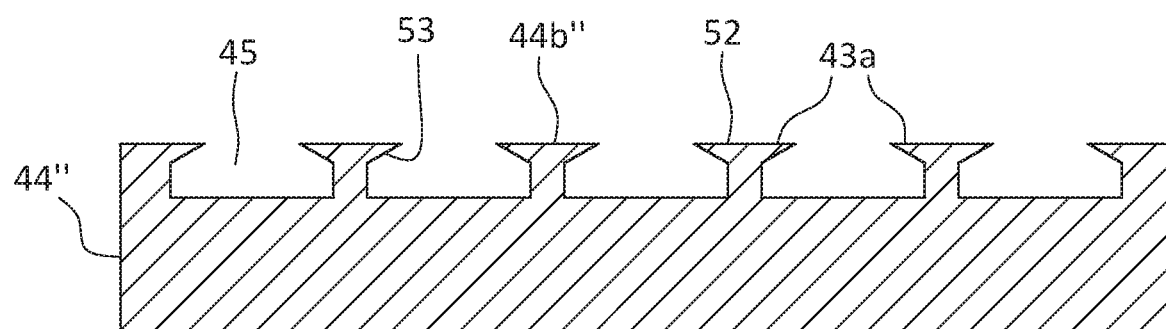
Figure 7:
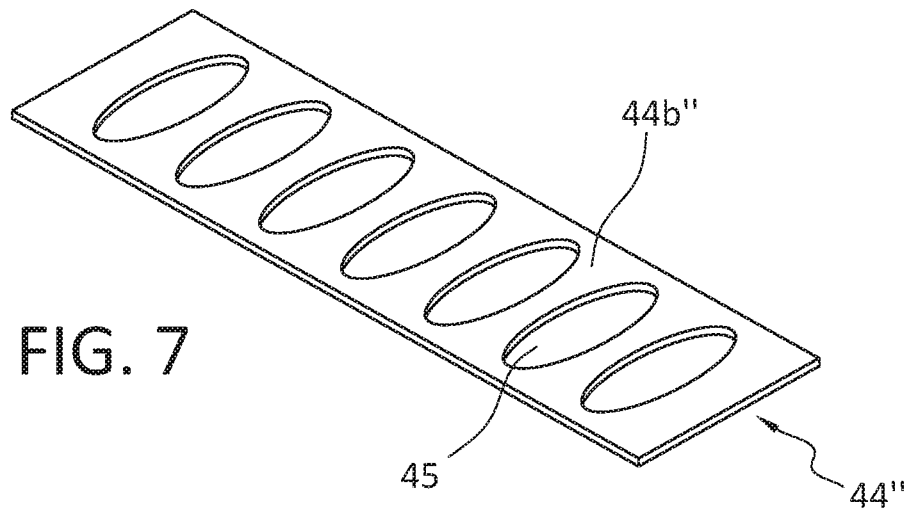
Figure 8:
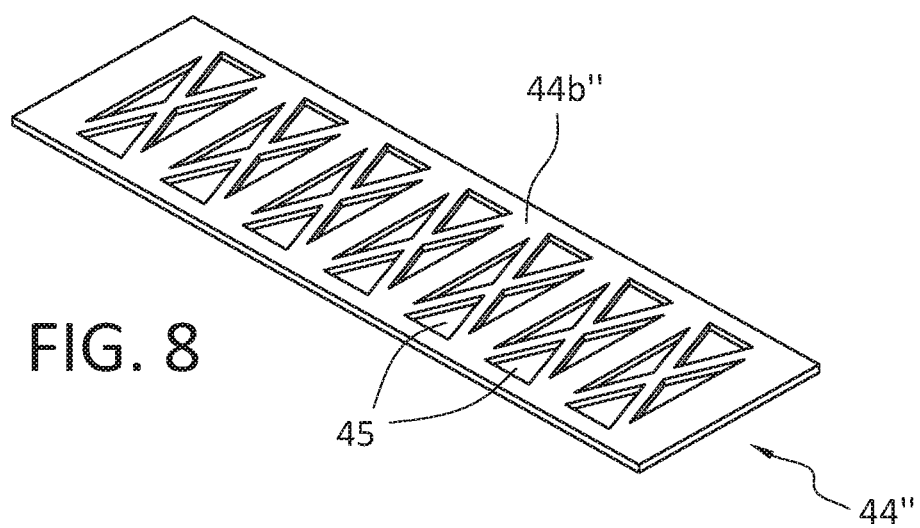
Figure 9:
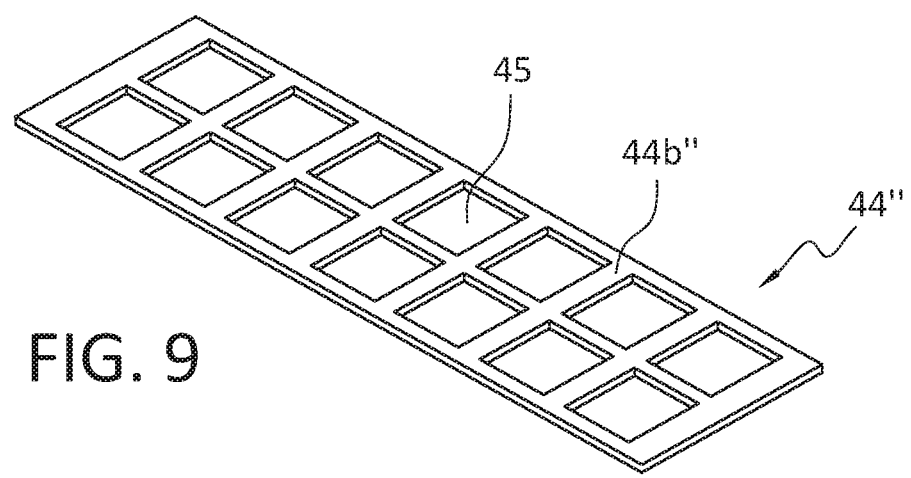
Figure 10:
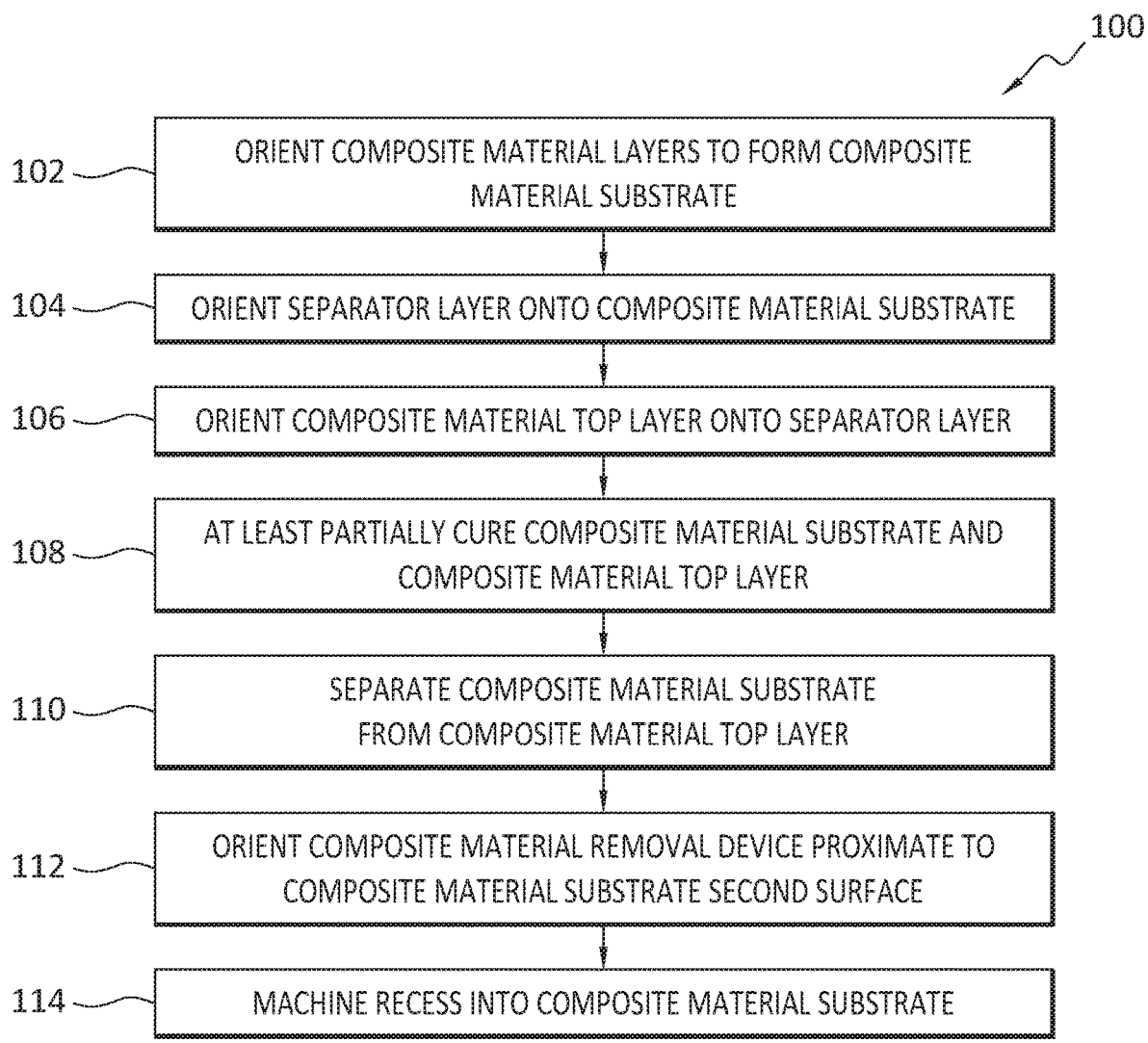
Figure 11:
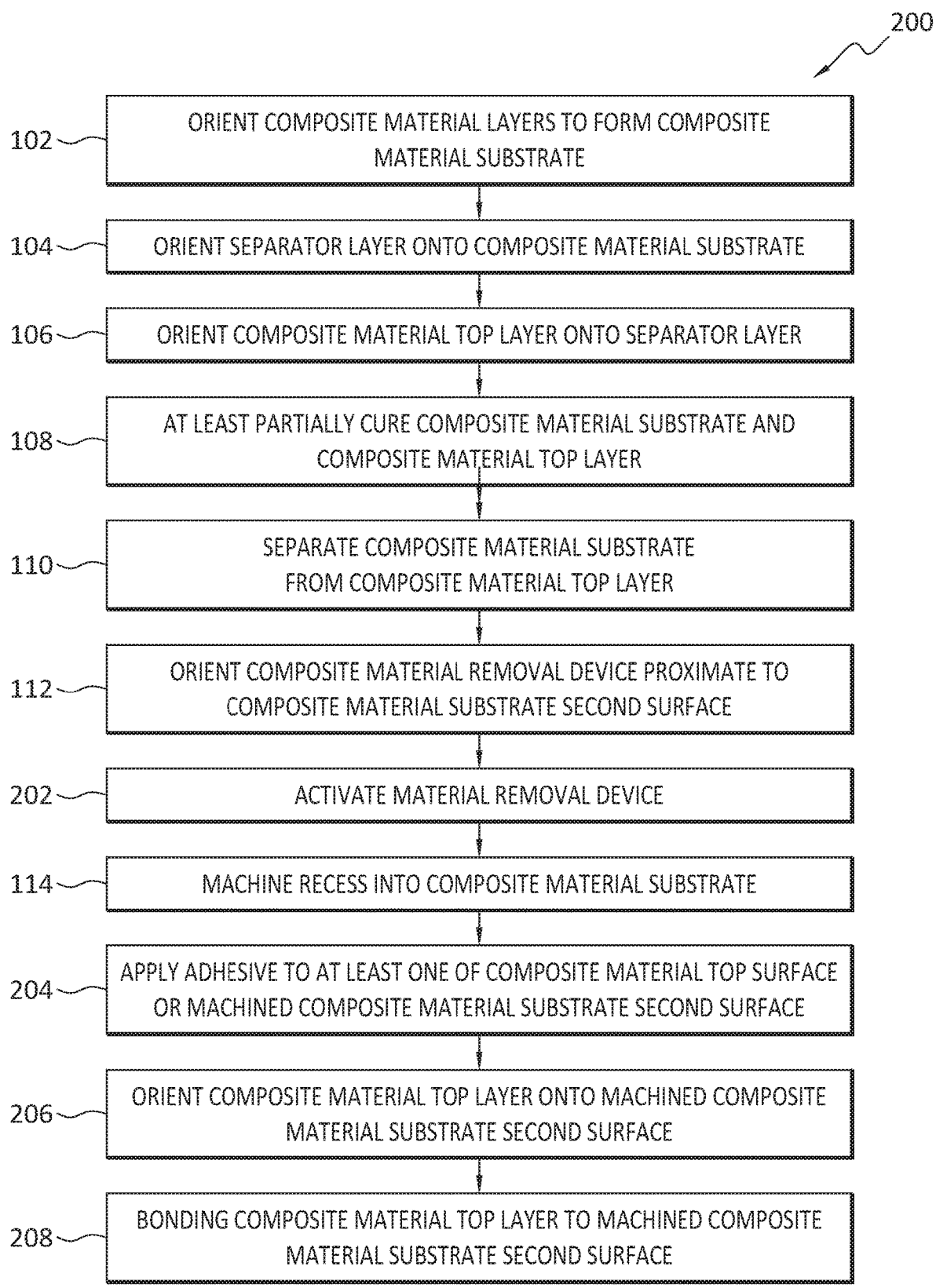
Figure 12:
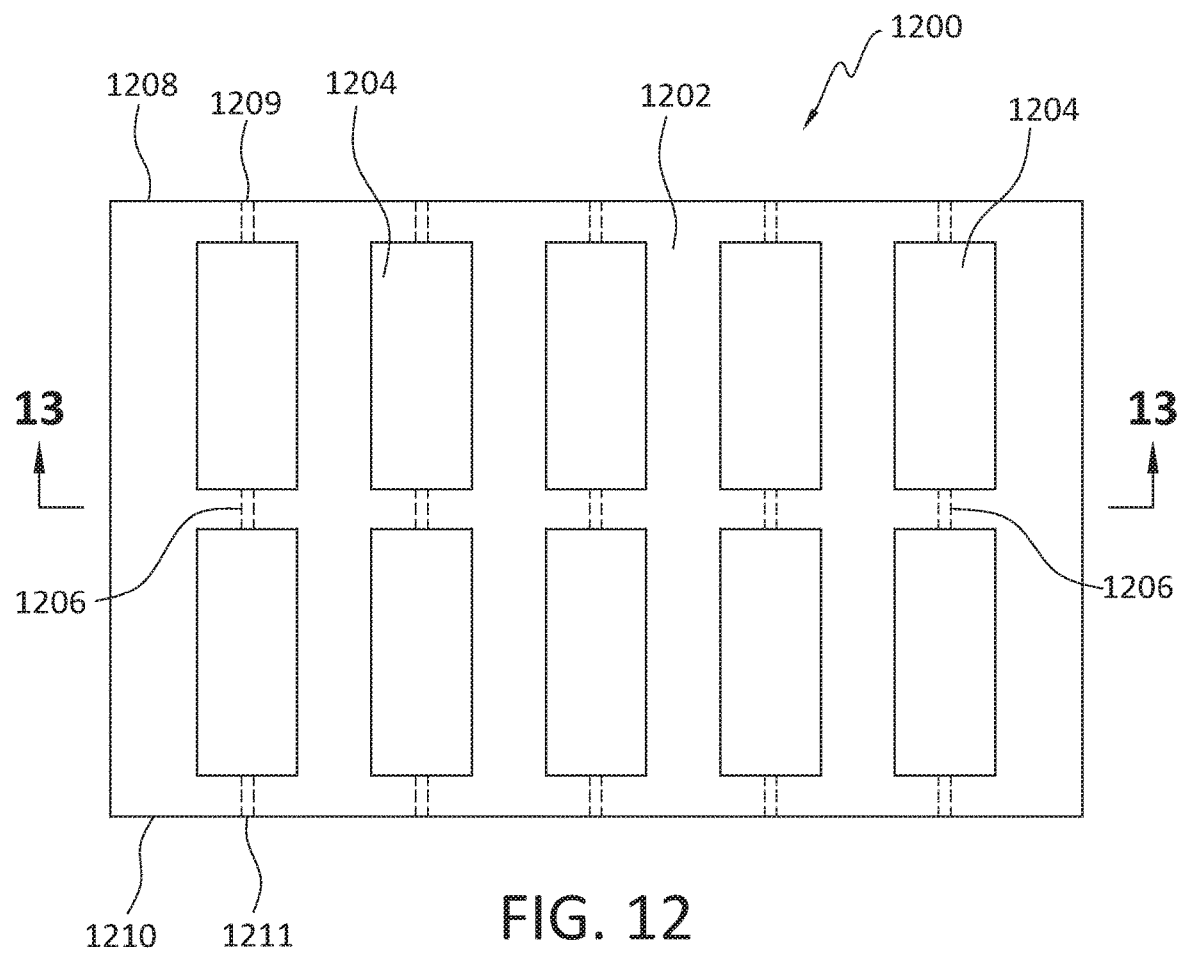
Figure 13:
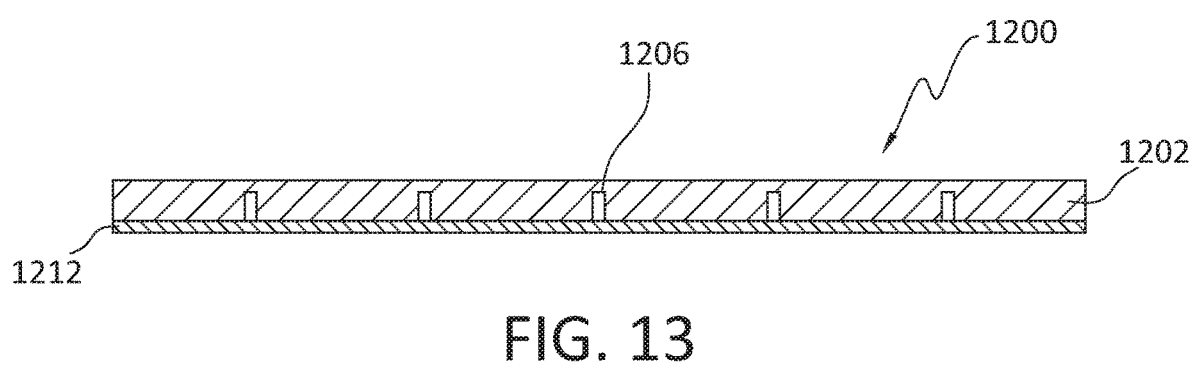
Figure 14:
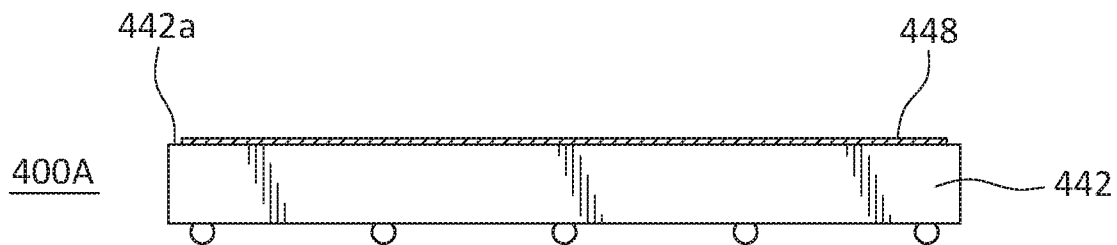
Figure 15:
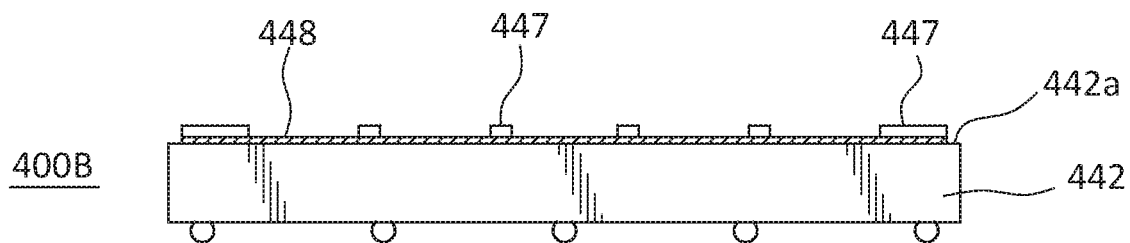
Figure 16:
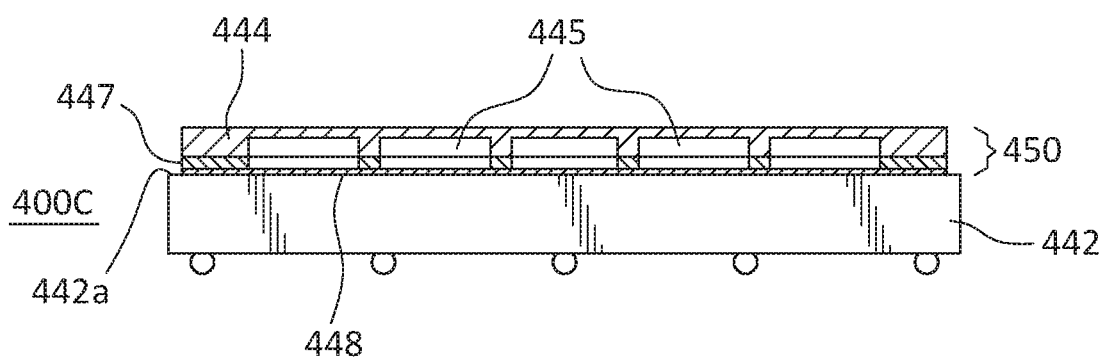
Figure 17:
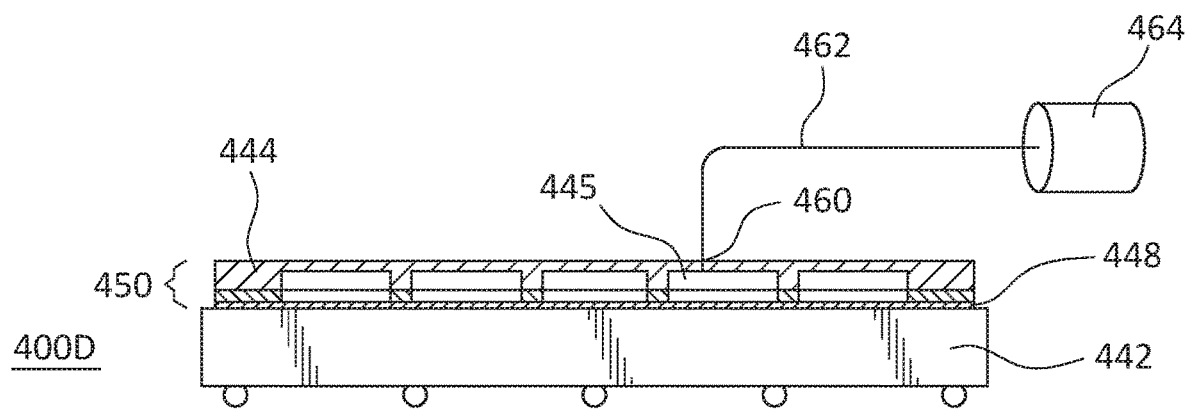
Figure 18:
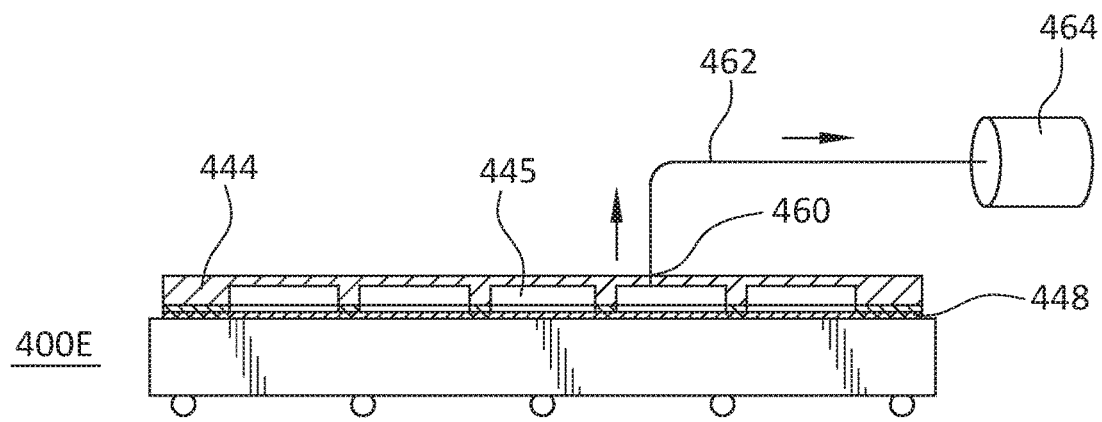
Figure 19:
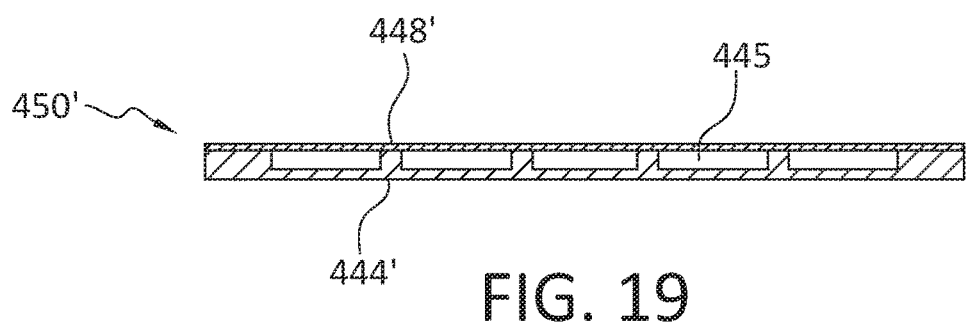
Figure 20:
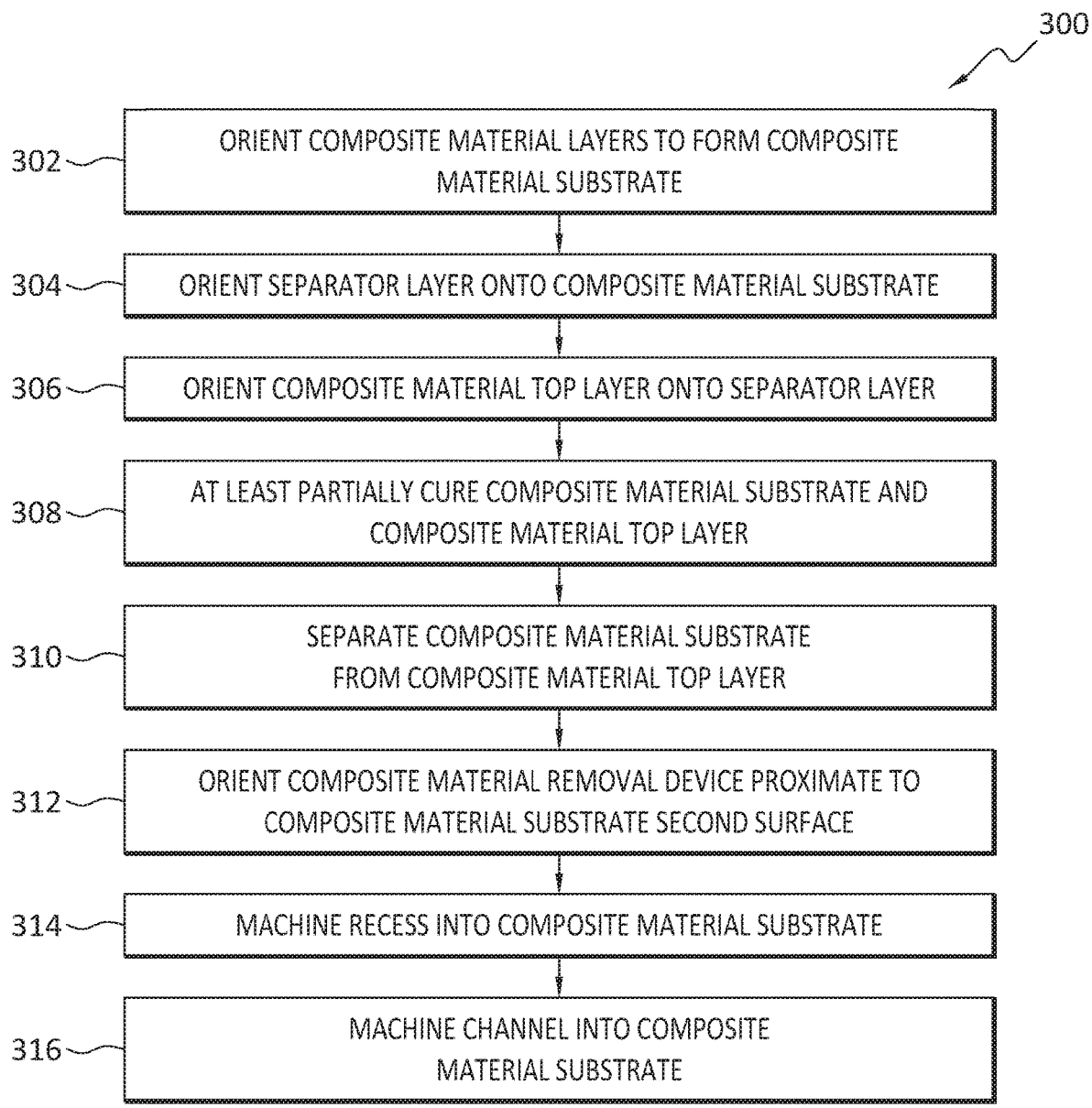
Figure 21:
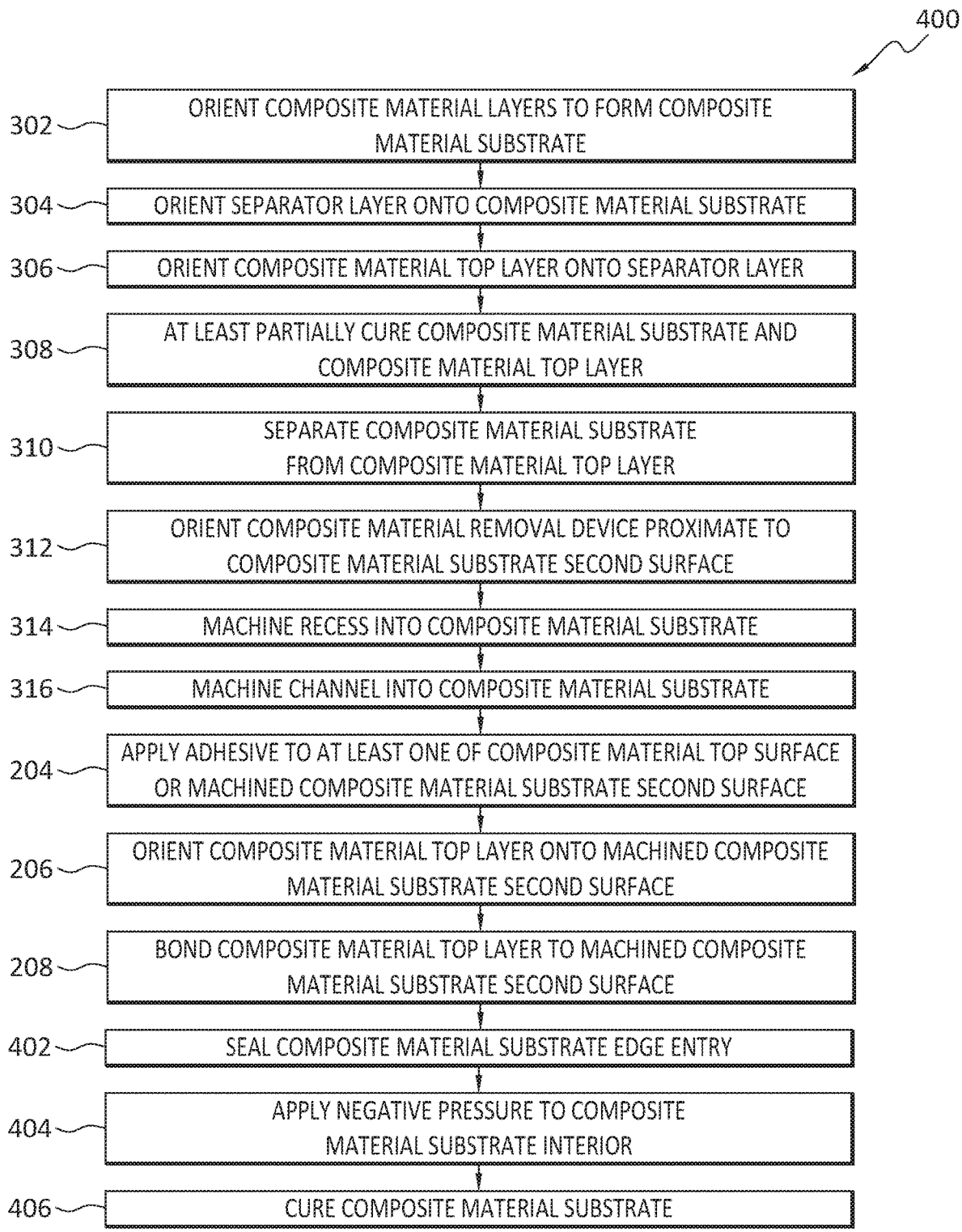

Having thus described variations of the disclosure in general terms, reference will now be made to the accompanying drawings, which are not necessarily drawn to scale, and wherein:

FIG. 1 is an illustration of a wing assembly according to present aspects;

FIG. 2A is a perspective view of a wing assembly construction according to present aspects;

FIG. 2B is a cross-sectional view of the wing assembly of FIG. 1 according to present aspects;

FIG. 3 is an illustration of a vehicle in the form of an aircraft comprising assemblies according to present aspects;

FIG. 4A is a side view of a manufacturing step according to present aspects;

FIG. 4B is a side view of a manufacturing step according to present aspects;

FIG. 4C is a side view of a manufacturing step according to present aspects;

FIG. 4D is a side view of a manufacturing step according to present aspects;

FIG. 4E is a side view of a manufacturing step according to present aspects;

FIG. 4F is a side view of a manufacturing step according to present aspects;

FIG. 4G is a side view of a manufacturing step according to present aspects;

FIG. 5 is an overhead view of a machined composite substrate material according to present aspects;

FIG. 6A is a cross-sectional side view of a composite material substrate machined to form a recess in the composite material substrate thickness according to present aspects;

FIG. 6B is a cross-sectional side view of the composite material substrate of FIG. 6A machined to form a recess in the composite material substrate thickness according to present aspects;

FIG. 6C is an overhead view representing the composite material substrate shown in FIGS. 6A and/or 6B, and showing a plurality of recesses machined into the composite material substrate, according to present aspects;

FIG. 6D is a cross-sectional side view of a composite material substrate machined to form a recess in the composite material substrate thickness according to present aspect, and showing recesses machined into the composite material substrate comprising internal fillet edges in the machined recesses;

FIG. 6E is a cross-sectional side view of a composite material substrate machined to form a recess in the composite material substrate thickness according to present aspect, and showing recesses machined into the composite material substrate comprising internal chamfer edges in the machined recesses;

FIG. 7 is a perspective view of a machined composite material substrate having a plurality of recesses having a geometric profile that includes a predetermined pattern of ellipses, according to present aspects;

FIG. 8 is a perspective view of a machined composite material substrate having a recess geometric profile that includes a predetermined pattern of triangles, according to present aspects;

FIG. 9 is a perspective view of a machined composite material substrate having a recess geometric profile that includes a predetermined pattern of rectangles, according to present aspects;

FIG. 10 is a flowchart outlining a method according to present aspects;

FIG. 11 is a flowchart outlining a method according to present aspects;

FIG. 12 is an overhead view representing the composite material substrate of the type shown in FIGS. 6A and/or 6B, with the additional features of machined channels shown interconnecting a plurality of recesses, and with the channels further shown as extending from the recesses to a composite material first edge or a composite material second edge according to present aspects;

FIG. 13 is a side view of the composite material substrate of the type shown in FIG. 12;

FIG. 14 is a side view of a manufacturing step according to present aspects;

FIG. 15 is a side view of a manufacturing step according to present aspects;

FIG. 16 is a side view of a manufacturing step according to present aspects;

FIG. 17 is a side view of a manufacturing step illustrating vacuum bonding, according to present aspects;

FIG. 18 is a side view of a manufacturing step according to present aspects;

FIG. 19 is a side view of a manufacturing step according to present aspects;

FIG. 20 is a flowchart outlining a method according to present aspects;

FIG. 21 is a flowchart outlining a method according to present aspects.

Figure 26:
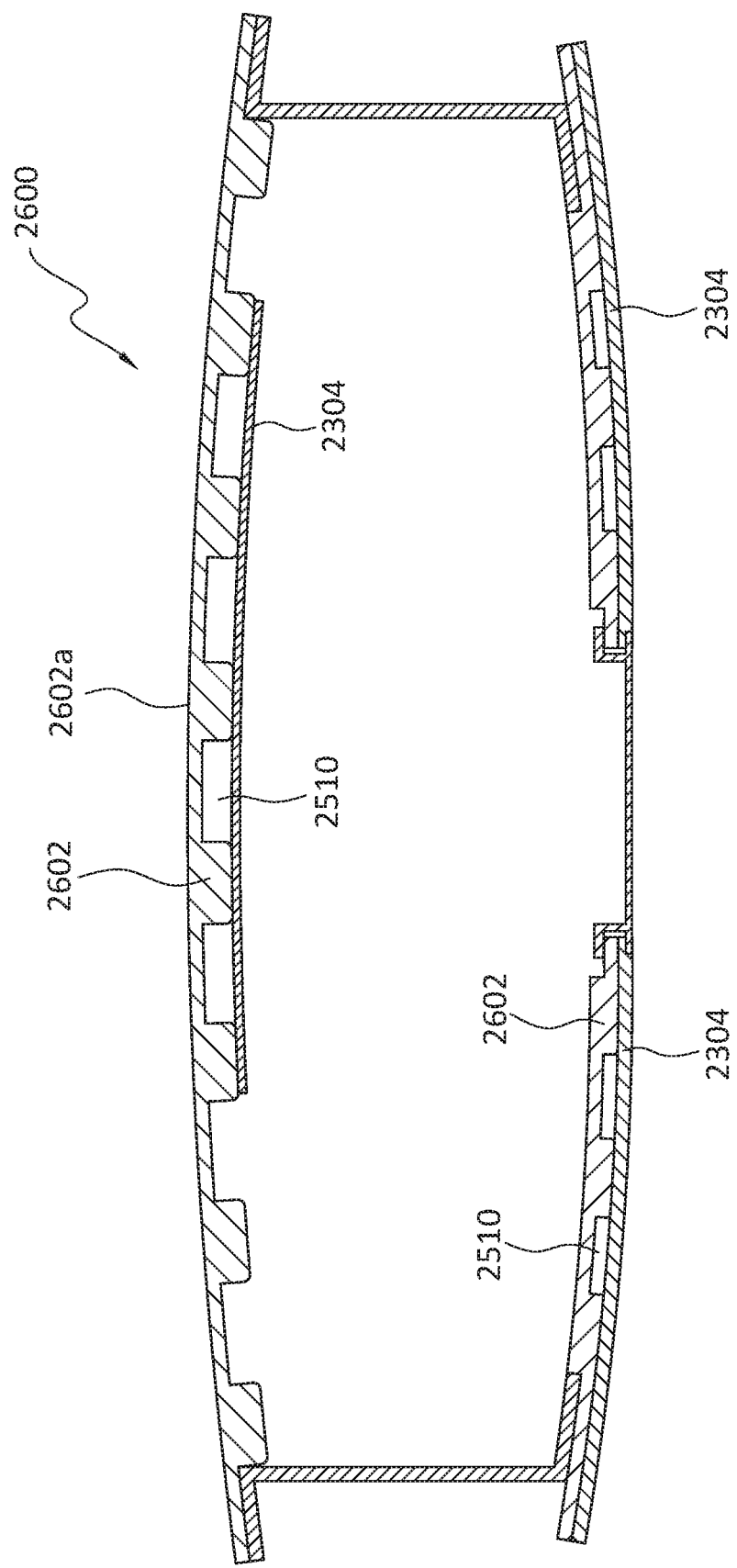
Figure 27:
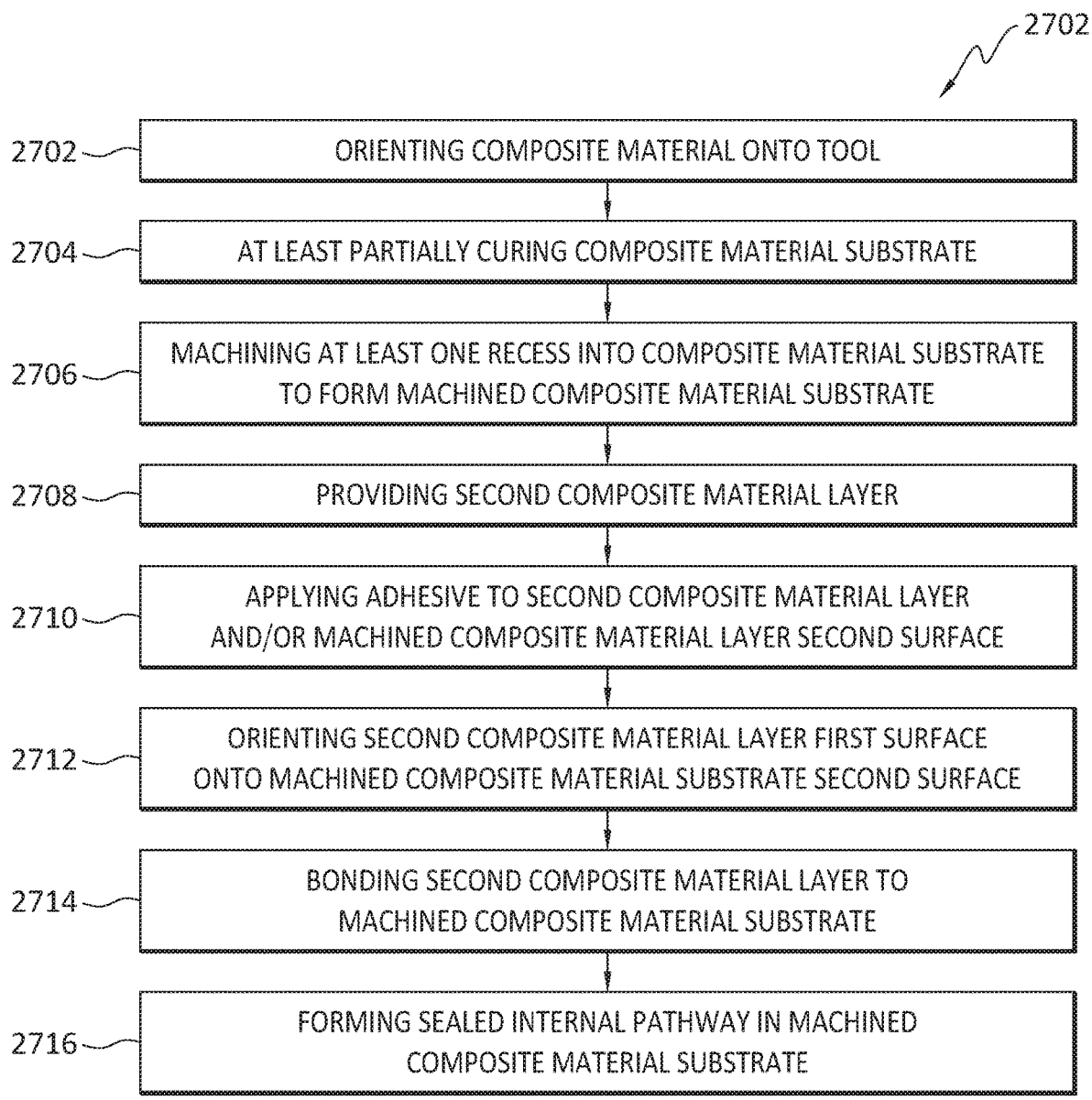

FIG. 22 is a cross-sectional side view of a composite material substrate, according to a present aspect;

FIG. 23 is a cross-sectional side view of a composite material substrate, according to a present aspect;

FIG. 24 is a cross-sectional side view of a composite material substrate machined to form a recess in the composite material substrate thickness according to present aspect;

FIG. 25 is a cross-sectional side view of a composite material substrate machined to form a recess in the composite material substrate thickness, according to present aspect;

FIG. 26 is a cross-sectional side view of a component comprising the composite material according to a present aspect;

FIG. 27 is a flowchart outlining a method according to present aspects; and

Figure 28:
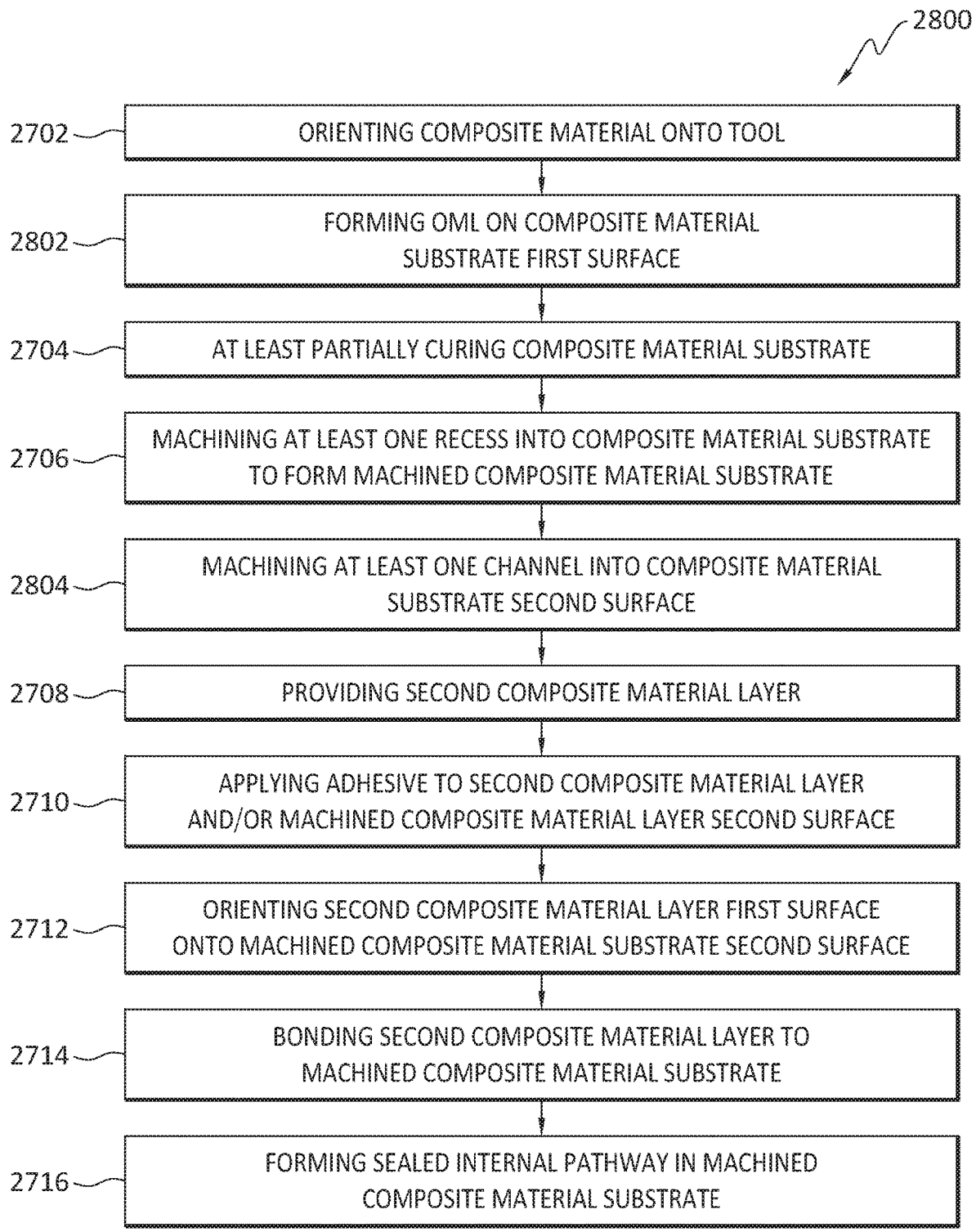

FIG. 28 is a flowchart outlining a method according to present aspects.

DETAILED DESCRIPTION

Aspects of the present disclosure are directed to a composite material construction that can be a two-piece construction where one piece can be a composite material substrate that is machined to form a machined composite material substrate with portion of the composite material substrate removed by a material removal device to form a predetermined pattern of removed material. The removed material can form at least one recess (referred to equivalently herein as "pocket"), in the composite material substrate. The machined composite material substrate is then bonded to a composite material top layer with the at least one recess covered by the composite material top layer. Further present aspects contemplate the use of a thermoset material as the material substrate. According to further aspects, the material substrate can be a metal material substrate that is covered by a composite material top layer or a metal top layer.

According to present aspects, the components manufactured according to disclosed methods and systems employ a two-piece design with the two pieces sized to ensure structural integrity even in the event of a failure at the bond line. Further aspects contemplate use of the manufactured components as wing skins that are compression dominated (upper skins), as well as wing skins that are tension dominated (lower skins).

FIG. 1 shows an overhead perspective view of a composite assembly shown in the form of a non-limiting wing assembly that can be configured for attachment to an aircraft (shown in FIG. 3). As shown in FIG. 1, composite component 10 (that can be, in non-limiting fashion, and shown in FIG. 1 in an exemplary illustration, as a wing assembly) includes a 2-piece assembly comprising a composite material substrate 12 that further comprises recesses 14 that appear in the composite material substrate 12 in a predetermined pattern, with the individual recesses further comprising a predetermined geometric profile (shown in FIG. 1 as a predetermined pattern of rectangles) that can be the same or different from other recesses. As further shown in FIG. 1, the composite component 10 further comprises a composite material top layer 20 that is fixedly attached to the composite material substrate 12.

FIG. 2A is a perspective view of the composite component 10 shown in FIG. 1. As shown in FIG. 2A, composite component 10 includes a 2-piece assembly comprising composite material substrate 12 that further comprises recesses 14 that appear in composite material substrate 12 in a predetermined pattern, with the individual recesses further comprising a predetermined geometric profile (shown in FIG. 1 as a predetermined pattern of rectangles) that can be the same or different from other recesses. Composite material substrate 12 further comprises a composite substrate material first surface (also referred to equivalently herein as composite substrate material first side) 12a, a composite substrate material second surface 12b (also referred to equivalently herein as composite substrate material second side). FIG. 2A further shows composite material top layer 20 that includes composite material top layer 20 comprises a composite material top layer first surface (also referred to equivalently herein as composite top layer material first side) 20a and a composite material top layer second surface (also referred to equivalently herein as composite material top layer second side) 20b.

FIG. 2B is a cross-sectional view of the composite assembly shown in FIG. 1 taken across line "A-A". As shown in FIG. 2B composite component 10 (that can be, in non-limiting fashion, and shown in FIG. 1 in an exemplary illustration, as a wing assembly) includes a 2-piece assembly comprising a composite material substrate 12. Composite material substrate 12 further comprises a composite substrate material first surface (also referred to equivalently herein as composite substrate material first side) 12a, a composite substrate material second surface (also referred to equivalently herein as composite substrate material second side) 12b, and recesses 14. As shown in FIGS. 1, 2A and 2B, recesses 14 appear in the composite material substrate 12 in a predetermined pattern, with the individual recesses 14 further comprising a predetermined geometric profile (shown in FIGS. 1, 2A and 2B as a predetermined pattern of rectangles) that can be the same or different from other recesses. As further shown in FIG. 2B, composite component 10 further comprises a composite material top layer 20 that is fixedly attached to the composite material substrate 12. Composite material top layer 20 comprises a composite top layer material first surface 20a and a composite material top layer second surface 20b. Recesses 14 are shown as bounded by recess wall 18, recess floor 16, and composite material top layer second surface 20b. As shown in FIG. 2B, an adhesive material layer 26 is interposed between composite substrate material second surface 12b and composite top layer material first surface 20a. Though a composite assembly is described and shown in FIGS. 1, 2A, and 2B, present aspects contemplate the component made from a metal substrate, including a metal substrate having machined recesses. According to such aspects, the top layer can be a composite material top layer or a metal material top layer.

FIG. 3 is a representative illustration of a vehicle 30, in the non-limiting form of an aircraft, showing wing 32 comprising composite component 10 of the type disclosed herein and, for example, as shown in any of FIGS. 1, 2, and 3. While the composite material substrate is shown in the accompanying FIGS. incorporated into a wing assembly for an aircraft, according to present aspects, composite components incorporating the machined composite material substrates with recesses machined into the composite material substrates can be used in the manufacture of other aircraft and other vehicle components including, for example, tail section vertical stabilizer 34, tail section horizontal stabilizer 36, etc.) in addition to assemblies in, for example, vehicles including, without limitation a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; or combinations thereof. In further aspects, although the wing 32 shown in FIG. 3 comprises composite components, according to further present aspects, the wing can comprise metal components.

FIGS. 4A, 4B, 4C, 4D, 4E, 4F, and 4G (collectively referred to herein as FIGS. 4A-4G) represent an illustrative progression of stages, according to present aspects, in the manufacture of the presently disclosed composite components. As shown in FIG. 4A, initial stage 40A shows a molding tool 42 having a molding tool surface 42a, onto which is deposited (to a predetermined thickness) a predetermined amount of composite material substrate 44. Composite material substrate 44 has a composite material substrate first surface 44a in contact with the molding tool, and a composite material substrate second surface 44b. According to present aspects, a predetermined thickness of composite material substrate 44 (uncured) is deposited onto molding tool 42 to form a predetermined thickness of cured composite material substrate while accounting for composite material shrinkage during curing.

According to present aspects, non-limiting representative composite materials for use in making the composite material substrate and the composite material top layer can include resin-containing materials such as, for example, diglycidyl ethers of bisphenol A; diglycidyl ethers of bisphenol F; N,N,N',N'-tetragylcidyl-4,4'-diaminophenylmethane; p-aminophenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc., thermoset materials, and combinations thereof. According to further aspects, non-limiting fiber components of fiber-containing materials include carbon fibers, boron fibers, glass fibers, aramid fibers, etc., and combinations thereof.

When a component substrate is made from an metal and wherein recesses and/or channels are machined into the metal component (e.g., the metal substrate second surface), the component forming processes, according to present aspects will be consistent with metal material removal processes and machinery that can include, for example, CNC machines, lasers, etc. If an outer mold line (OML) is required in the metal substrate first surface, similar metal forming processes and machinery can be used, according to present aspects.

The molding tool for the fabrication of the composite material substrate can alternately be referred to herein and otherwise include "mandrels", and can be made of metals or non-metals and can be any device capable of supporting a composite material laminate lay-up (e.g., the lay-up comprising any predetermined number of individual composite material prepregs, etc.) and also capable imparting or transferring surface characteristics from a tooling surface to a surface of the composite laminate surface including, for example, an outer mold line or an inner mold line. According to further present aspects, the methods and systems disclosed herein can be used to machine non-prepreg materials including, for example, single and/or multilayered thermoset materials.

As shown in FIG. 4B, in second stage 40B a separator layer 46, that can be, for example, a caul plate, is oriented in position proximate to the composite material substrate second surface 44*b*. The separator layer 46 can be a separator film or separator sheet, in combination with, or integrating a release material film or other release agent, etc. The separator layer deposited onto or otherwise oriented onto the composite material substrate second surface 44*b*, such that the separator layer 46 is interposed between the composite material substrate surface 44*b* and the composite material top layer (shown in FIG. 4C).

In the third stage 40C, shown in FIG. 4C, a composite material top layer 48 is deposited onto the separator layer 46. The separator layer in the form of, for example a separator sheet, in combination with a release material film or other release agent, etc., is deposited onto or otherwise positioned or otherwise interposed between the composite material top layer 48 and the composite material substrate 44. The separator layer 46 can be any layer, film, etc. that can act as a parting layer or parting plane for the purpose of facilitating the separation of the at least partially cured composite material top layer 48' from the at least partially cured composite material substrate 44' (e.g., as shown in FIG. 4D). According to presently disclosed methods, heat, or heat and pressure are provided for the purpose of at least partially curing the composite material substrate 44 and at least partially curing the composite material top layer 48 to form an at least partially cured composite material substrate 44' and an at least partially cured composite material top layer 48' (for example, as shown in FIG. 4D). The at least partially cured composite material top layer 48' comprises an at least partially cured composite material top layer first surface 48*a*' and an at least partially cured composite material top layer second surface 48*b*'. The at least partially cured composite material substrate 44' comprises an at least partially cured composite material substrate first surface 44*a*' and an at least partially cured composite material substrate second surface 44*b*'.

In the fourth stage shown in FIG. 4D, the at least partially cured composite material top layer 48' is separated from the at least partially cured composite material substrate 44'. As further shown in FIG. 4D, the at least partially cured composite material top layer 48' is removed from the now at least partially cured composite material substrate 44'. The at least partially cured composite material substrate 44' comprises an at least partially cured composite material substrate first surface 44*a*' and an at least partially cured composite material substrate second surface 44*b*'. The at least partially cured composite material top layer 48' comprises an at least partially cured composite material top layer first surface 48*a*' and an at least partially cured composite material top layer second surface 48*b*'. As shown in FIG. 4D, after at least partially curing the composite layers, the layers can be separated and, according to one aspect, if the separator layer remains as a discrete layer, the separator layer is removed. In another aspect, during the separator layer can become indistinguishable from the surrounding layers, but the function of the separator layer is accomplished through curing such that the at least partially cured composite material top layer 48' and the at least partially cured composite material substrate 44' can be separated from one another. While the at least partially cured composite material substrate 44' is shown in FIGS. 4D and 4E as being retained in contact with the molding tool 42, according to present aspects, alternative manufacturing processes and stages include removing the at least partially cured composite material substrate 44' from the molding tool 42 after forming the at least partially cured composite material substrate 44'.

Present aspects contemplate the use of an external heating device (e.g., autoclave, oven, heaters, etc.), optionally in combination with pressure, to achieve an at least partial cure of the composite material substrate and the composite material top layer. Further present aspects contemplate at least partially curing the composite material substrate and the composite material top layer under pressure while heating according to accepted composite material curing regimens and protocols.

The fifth stage is shown at FIG. 4E, where the at least partially cured composite material substrate 44' has been machined to form a machined composite material substrate 44". The machined composite material substrate 44" comprises a machined composite material substrate first surface 44*a*" and a machined composite material substrate second surface 44*b*". According to present aspects, and as will be later described more fully, the at least partially cured composite material substrate 44' is machined to form recesses in the at least partially cured composite material substrate 44'. The recesses 45 are shown extending from the machined composite substrate material second surface 44*b*" and into the substrate to a predetermined distance into the substrate thickness.

While FIG. 4E is not drawn to scale, according to present aspects, the depth of the recesses can be any practical depth that will recognize and account for competing factors of weight reduction of the substrate through material removal (e.g. machining, etc.) and retained stiffness and/or strength of the machined composite material substrate. According to present aspects, the balancing of strength, weight, and stiffness factors can be achieved by machining the recesses to a depth into the composite material substrate representing a distance from the surface (e.g., a depth distance, etc.) of from about 50% to about 80% of the total thickness of the composite substrate material. In another aspect, the machining of the recesses into the composite material substrate is conducted such that the depth, or depth distance, of the recesses is machined into the composite substrate material to a depth ranging from about 10% to about 90% of the total thickness of the composite material substrate. In a further aspect, the machining of the recesses into the composite material substrate is conducted such that the depth, or depth distance, of the recesses is machined into the composite substrate material to a depth ranging from about 20% to about 80% of the total thickness of the composite material substrate For example, according to present aspects, a composite material component incorporating presently disclosed machined composite material substrates can be tailored to have a predetermined material stiffness (for example, as determined according to ASTM C297). According to present aspects, the machining of the recesses into the composite material substrate is conducted such that the depth, or depth distance, of the recesses machined into the composite substrate material is not more than a depth ranging from about 50% to about 80% of the total thickness of the composite material substrate. That is, by way of example, and according to present aspects, if the total thickness of a composite material substrate is 1.5 inches thick, the depth of the recess machined into the composite material substrate extends from the composite material substrate surface to a depth into the composite material substrate ranging from about 0.75 inches to about 1.2 inches. By way of further example, and according to present aspects, if the total thickness of a composite material substrate is 1.0 inches thick, the depth of the recess machined into the composite material substrate extends from the composite material substrate surface to a depth into the composite material substrate ranging from about 0.50 inches to about 0.8 inches. According to present aspects, by regulating the amount of material removal from the composite material substrate and placement or location of material removal from the composite material substrate, the strength, stiffness and other characteristics can be tailored to accommodate a multitude of predetermined design specifications (e.g., parameters).

According to further present aspects, the machining of a predetermined pattern of recesses machined at predetermined locations and at predetermined depths into the composite material substrate can be controlled such that the composite material substrate provides a reinforcement function to the wing assembly that can obviate the need for discrete reinforcing layers or that can obviate the need for a number of reinforcing components previously required in wing assemblies (e.g., stringers, frames, fasteners attaching ribs, stringers, frames, etc.). The wing assemblies and composite material substrates disclosed herein, and according to present aspects, obviate the need for the incorporation of discrete reinforcing components or discrete reinforcing layers, and, in so doing, can reduce the number of inventoried parts for, for example, a wing assembly. According to a predetermined design, overall weight reduction of objects incorporating the presently disclosed components can be realized. According to present aspects, the composite material substrate is machined also for the purpose of building in integral reinforcing elements and properties into the composite material substrate. When the composite material substrate is used as in inner aircraft wing in a wing assembly, the machined composite material substrate comprises reinforcement capabilities and elements that closely approximate or even exceed the reinforcement capabilities of additional stringers, ribs, frame elements, fasteners, etc. that formerly performed the function of the machined composite material that, according to present aspects includes integral reinforcement elements machined into the composite material substrate; but with a significant weight reduction as compared to typical wing assemblies that necessarily include, for example, stringers, spars, frame elements, fasteners, etc. If a particular component weight (e.g., a wing or wing assembly component, etc.) must be maintained to preserve overall design constraints that can include, for example, proper balancing, etc., through material selection and material processing (e.g., curing, etc.), the presently obtainable components and assemblies can be manufactured to approximate the weight of former components that incorporate the additional reinforcing components (e.g., stringers, spars, frame elements, fasteners, etc.).

When weight reduction is a factor, present methods, systems, and apparatuses can produce components having a reduced weight without sacrificing predetermined characteristics including, for example, strength, stiffness, etc. By way of example, an exemplary composite material panel having dimensions of 72 inches (width)×720 inches (length)×1.25 inches (thickness) has a volume of 64,800 in$^3$. According to present disclosed methods, if a pattern of recesses having dimensions of 7 inches (width)×22 inches (length)×1 inch (thickness) is removed from the panel, and 240 recesses are machined into the panel, the total amount of material removed equates to 36,960 in$^3$. Such a removal of material therefore results in a volume reduction of about 57% along with a commensurate weight reduction. Such a weight reduction in a structural component (e.g., a wing panel in an aircraft) that is also machined to afford reinforcement while obviating the need for additional internal structural supports and reinforcement (e.g., stringers, spars, frame elements, fasteners, etc.) can be significant. When the composite material substrates and components according to present aspects are incorporated into a vehicle, such weight savings can directly translate to lower fuel costs, increased payload, increased vehicle range, etc. The present aspects also significantly reduce component complexity and labor costs for manufacturing and installation, leading to further operational cost savings.

Though not computed herein with specificity, according to present aspects, when the component comprises a machined metal substrate, a significant weight savings will be also be realized as metal material is removed from the metal substrate to form the recesses and/or channels in the metal substrate.

FIG. 4F shows the at least partially cured composite material top layer 48' oriented in position proximate to the machined composite material substrate 44". As shown in FIG. 4F, an adhesive layer 47, referred to equivalently herein as a "bonding layer", can be interposed between the at least partially cured composite material top layer 48' and the machined composite material substrate second surface 44b". The at least partially cured composite material top layer 48' is disposed onto the machined composite material substrate second surface 44b". Adhesive layer 47 can comprise any adhesive or bonding material useful to bond the machined and at least partially cured composite material top layer 48' to the machined composite material substrate. According to present aspects the adhesive selected for use in the adhesive layer can be selected to be compatible with the substrate material and the top layer for the purpose of effected a predetermined bond. According to present aspects, the adhesive material selected for the adhesive material layer can be a co-curable adhesive that can co-cure and/or co-bonded within or outside of the curing regimens, protocols, and conditions observed for providing a final curing for the composite material substrate and the composite material top layer. Present aspects further contemplate bonding processes including pressure including, for example, processes under vacuum, etc.

FIG. 4G is a perspective exploded view of a component assembly 49 showing the at least partially cured composite material top layer 48' and the machined composite material substrate 44" with machined recesses 45 visible having been machined into the at least partially cured composite material substrate to form the machined composite material substrate 44" (and as shown in assembled form, for example, in FIG. 4F). As further shown in FIG. 4G, an adhesive layer 47 can be applied to at least one of the machined composite material substrate second surface 44b" and the at least partially cured composite material top layer second surface 48b' (shown in FIGS. 4F and 4G as the "underside" of the at least partially cured composite material top layer 48'.

FIG. 5 is an overhead view of a machined composite material substrate 44" showing a plurality of recesses 45 machined into the substrate, and in a predetermined pattern of material removal from the recesses.

Between illustrated steps 40D and 40E, (Shown in FIGS. 4D and 4E), present aspects are directed to a machining step to machine recesses into the at least partially cured composite material substrate 44' with the recesses formed into the composite material substrate to a predetermined thickness and in a predetermined pattern (and to form the machined composite material substrate 44"), with the individual recesses further comprising a predetermined geometric profile that can be the same or different from other recesses. The geometric profile is produced by removing a predetermined amount of composite substrate material from the composite material substrate, forming a three-dimensional recess of a predetermined shape and having a predetermined volume. According to further aspects, the predetermined volume can represent a three-dimensional geometric profile. The geometric profile of an individual recess in the predetermined pattern of recesses can be the same or can vary among the recesses, and can be any shape in two or three dimensions, including a rectangle, an ellipse, a circle, a triangle, a polygon, an irregular shape, or combinations thereof.

FIG. 6A is a partial cross-sectional view of the at least partially cured composite material substrate 44' being machined to form a machined composite material substrate 44". As shown in FIG. 6A, a material removal device 62 is shown in the form of a laser. According to present aspects the material removal device 62 can be in communication with a controller 64 that can, in turn be in communication with a processor 66 that can be programmed to deliver a signal to the controller 64 that can control, for example, the activation, movement, speed, etc., of the material removal device 62 for the purpose of, for example, cutting into the at least partially cured composite material second surface 44b' to a predetermined distance or predetermined thickness according to a programmed value inputted, for example at a processor input 68 to form a plurality of recesses 45 that are formed into the at least partially cured composite material substrate in a predetermined pattern. In an alternate aspect, the material removal device 62 is in communication with the processor 66 and the processor includes an integrated controller 67.

FIG. 6B is a partial cross-sectional view of the at least partially cured composite material substrate 44' being machined to form a machined composite material substrate 44". As shown in FIG. 6B, a material removal device 62, optionally in communication with a support 61, is shown in the form of a CNC device (referred to equivalently herein as a "CNC cutting machine", or "CNC machine", or CNC milling machine"), although present aspects contemplate the use of any material removal device including, for example, a laser, etc.

According to present aspects, the material removal device 62 can be in communication with a controller 64 that can, in turn be in communication with a processor 66 that can be programmed to deliver a signal to the controller 64 that can control, for example, the activation, movement, speed, etc., of the material removal device 62 for the purpose of, for example, cutting into the at least partially cured composite material second surface 44b' to a predetermined distance or predetermined thickness according to a programmed value inputted, for example at a processor input 68 to form a plurality of recesses 45 that are formed into the at least partially cured composite material substrate in a predetermined pattern. In an alternate aspect, the material removal device 62 is in communication with the processor 66 and the processor includes an integrated controller 67. The machining processes illustrated in FIGS. 6A and 6B can also be used to machine a metal substrate in place of the described composite material substrate.

FIG. 6C shows an overhead plan view of a machined composite material substrate 44" with recesses 45 machined into the substrate. in a predetermined pattern, and to a predetermined thickness, with individual recesses 45 formed in the substrate such that according to present aspect, the recesses 45 are of a substantially uniform dimension. Although not shown, according to a further aspect, the recesses can be formed such that the dimension of an individual recess changes, or the dimension of at least one of the recesses 45 changes, relative to the rest of the recesses, and according to a predetermined pattern.

FIGS. 6D and 6E are enlarged cross sectional views of machined composite material substrates according to present aspects, showing alternate presently exemplary contemplated configurations for the recesses that are machined into the composite material substrates. As shown in FIG. 6D, a material removal device (not shown) that can be of the type shown in FIGS. 6A and/or 6B, has removed material from the composite material substrate to form recesses 45 and to form a machined composite material substrate 44". As shown in FIG. 6D, the recesses as shown have been machined to form fillet edges 51. In forming the fillet edges 51, recess surface regions 52 are preserved as compared to the recesses 45 shown in FIGS. 6A and 6B, for example. This additional surface area presented by the recess surface regions 52 provide additional surface area with which to adhere and/or bond the machined composite material substrate 44" to the at least partially cured composite material top layer 48' and can otherwise impact the structural integrity and strength and/or stiffness values of one or more of the machined composite material substrate 44" and a composite component 10 that can be a final composite component. According to present aspects, the design of the machined recesses can offer presently significant flexibility to the disclosed manufacturing methods and systems (as well as flexibility in the predetermined characteristics of the composite products machined by the present methods and systems).

As shown in FIG. 6E the recesses as shown have been machined to form chamfer edges 53. In forming the chamfer edges 53, recess surface regions 52 are preserved as compared to the recesses 45 shown in FIGS. 6A and 6B, for example. According to present aspects not specifically shown, the recesses can be machined into the composite material substrate to form recesses having any predetermined depth, any predetermined geometric profile, any predetermined volume, and the characteristics and dimensions of an individual recess can differ from other recesses according to predetermined end uses of the products (e.g. composite panels, assemblies, sub-assemblies, etc.). The machined recesses illustrated in FIGS. 6C, 6D, and 6F can similarly be formed into a metal substrate.

FIGS. 7, 8, and 9 are perspective views of machined composite material substrates, according to present aspects, where the recesses are shown having various geometric profiles. As shown in FIG. 7, a machined composite material substrate 44" comprising a machined composite material substrate second surface 44b", into which a pattern of recesses 45 have been machined to a predetermined thickness for the purpose of removing a predetermined amount of substrate material from the substrate. As shown in FIG. 7, the recesses exhibit a geometric profile of an ellipse, although according to present aspects, any predetermined geometric profile can be machined into the substrate to form a predetermined pattern of recesses having any predetermined geometric profile.

For example, as shown in FIG. 8, a machined composite material substrate 44" comprising a machined composite material substrate second surface 44b", into which a pattern of recesses 45 have been machined to a predetermined thickness for the purpose of removing a predetermined amount of substrate material from the substrate. As shown in FIG. 8, the recesses exhibit a geometric profile of a plurality of triangles, although according to present aspects, any predetermined geometric profile can be machined into the substrate to form a predetermined pattern of recesses having any predetermined geometric profile.

By way of a further example, as shown in FIG. 9, a machined composite material substrate 44″ comprising a machined composite material substrate second surface 44b‴, into which a pattern of recesses 45 have been machined to a predetermined thickness for the purpose of removing a predetermined amount of substrate material from the substrate. As shown in FIG. 7, the recesses exhibit a geometric profile of a rectangle (e.g., a rectangle in the form of a "square"), although according to present aspects, any predetermined geometric profile can be machined into the substrate to form a predetermined pattern of recesses having any predetermined geometric profile. The machined recesses ion the machined composite substrates illustrated in FIGS. 7, 8, and 9 can also be machined into a metal substrate to form a machined metal substrates.

According to present aspects, including, for example, those shown in FIGS. 7, 8, and 9, the recesses machined into the at least partially cured composite material substrate can be manufactured according to any predetermined pattern and individual recesses can be machined to have any predetermined geometric profile, including three-dimensional geometric profiles, such that the machined component can be tailored to achieve a predetermined strength, stiffness, etc. according to specified performance standards for the components that are manufactured according to present aspects. Having the ability to tailor strength and stiffness along the area of a large component, such as, for example, for an aircraft, spacecraft, rotorcraft, etc., can assist in the design and manufacturing of large structures to address emerging issues regarding aerodynamic response including, for example, flutter.

FIGS. 10 and 11 are flowcharts outlining methods according to further aspects of the present disclosure. As shown in FIG. 10, a method 100 according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 100 outlined in FIG. 10 further shows orienting 104 a separator layer onto the composite material substrate second surface. According to present aspects, the separator layer can be a caul plate or can be a film layer in combination with or otherwise integrating a release agent or release agent film. Method 100 as outlined in FIG. 10 further comprises orienting 106 a composite material top layer onto the separator layer, and at least partially curing 108 the composite material substrate and the composite material top layer to form at least partially cured composite material top layer and an at least partially cured composite material substrate having an at least partially cured composite material substrate second surface. Present aspects contemplate composite material curing protocols (temperature/pressure/time/ramp ups/cool downs, etc.) consistent with accepted practice for curing epoxy-resin containing composite materials, including so-called "bag and cure" techniques, for example, with heating applied under vacuum. According to one non-limiting example, and according to one aspect, a carbon-fiber epoxy-based composite material can observe a cure cycle comprising a temperature ramp up to about 350° F. and a 2 hour hold at such temperature. According to tailored and predetermined curing cycles, for example, and potentially in consideration of available production time, etc., ramp rates held at temperatures lower than 350° F. can be observed to accommodate, for example, a predetermined resin flow of an adhesive material, etc. In addition, during processing of the disclosed components comprising the machined composite material substrates with recesses, evacuation of some or substantially all of the air from the recesses (equivalently referred to herein as "recess pockets") can be accomplished under vacuum that can be a vacuum used during curing, or can be an additional vacuum supplied prior to curing, etc.

Method 100 further includes separating 110 the composite material top layer from the composite material substrate layer. Method 100 further includes optionally removing the separator layer from the composite material substrate to expose the composite material substrate second surface. Method 100 further includes orienting 112 a material removal device proximate to the composite material substrate second surface. According to present aspects, and as disclosed above, the material removal device can be a CNC machine, a laser, a drill, or other mechanical cutting device, etc., or combinations thereof. Method 100 further includes machining 114 at least one recess into the composite material substrate that can be a partially cured composite substrate material, and removing a predetermined amount of material from the composite material substrate to form a recess in the composite material substrate, said recess configured to extend from the composite material second surface to a predetermined distance into the composite material substrate thickness to form a machined composite material substrate, and with the machined composite material substrate comprising a machined composite material substrate first surface and a machined composite material substrate second surface.

As shown in FIG. 11, a method 200 according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 200 outlined in FIG. 11 further shows optionally orienting 104 a separator layer onto the composite material substrate second surface. According to present aspects, the separator layer can be a caul plate or can be a film layer in combination with or otherwise integrating a release agent or release agent film. Method 200 as outlined in FIG. 11 further comprises orienting 106 a composite material top layer onto the heating device, and at least partially curing 108 the composite material substrate and the composite material top layer to form at least partially cured composite material top layer and an at least partially cured composite material substrate having an at least partially cured composite material substrate second surface.

Method 100 further includes separating 110 the composite material top layer from the composite material substrate layer. Method 100 further includes orienting 112 a composite material removal device proximate to the composite material substrate second surface. According to further aspects, method 200 further includes activating 202 the material removal device, machining 114 at least one recess into the at least partially cured composite material substrate, with the recess configured to extend from the composite material second surface to a predetermined distance into the at least partially cured composite material substrate to form a machined composite material substrate, said machined composite material substrate comprising a machined composite material substrate first surface and a machined composite material substrate second surface. Method 200 further includes applying 204 an adhesive material layer to at least one of the composite material top layer or the machined composite material substrate second surface, orienting 206 the composite material top layer onto the machined composite material substrate second surface, and bonding 208 the composite material top layer to the machined composite material substrate second surface.

As with method 100 described above in FIG. 10 and as according to present aspects, in method 200, the material removal device can be a CNC machine, a laser, a drill, or other mechanical cutting device, etc., or combinations thereof. Present aspects further contemplate incorporating robotics and commensurate automation and control systems with the material removal device and material removal steps, including, for example, the incorporation of robotics also contemplated according to present aspects.

According to further present aspects, the composite material substrates disclosed herein can further improve composite manufacturing processes (e.g. curing, etc.) and the composite material substrates can be used as components that use the machined recesses to advantage.

For example, according to present aspects, the machining protocol used to fabricate the recesses into the composite material second surface can be modified to machine channels or passageways from one recess to another. In this way, one recess can be in communication with another recess, as the channels (referred to equivalently herein as "grooves") extend from one recess to another recess. That is, in this aspect, the recesses are not entirely bounded by the composite material substrate. Instead, at least one wall about the perimeter of a (e.g., first) recess is "breached" as a channel is machined through a predetermined point in the recess perimeter. The channel can be machined from one recess and then into and through a region of composite substrate material until another (e.g., a second) recess is encountered and 'breached". That is, the channel is (or a plurality of channels are) machined into the composite material substrate for the purpose of interconnecting or intersecting a plurality of recesses. Put another way, according to one aspect, a plurality of recesses can be placed into communication with one another by fabricating a passageway or pathway in the form of a channel formed into the composite material substrate.

In another aspect, a component comprising the composite material substrates having the recesses can have a composite material substrate first edge (e.g., a front side or front edge) and a composite material substrate second edge (e.g., a back side or back edge). By way of example, such a composite component can be, for example, an inner wing skin component for an aircraft, or other component, where an interior passageway (equivalently referred to herein as an "interior pathway", "internal passageway", and/or "internal pathway") comprising interconnected recesses and channels from one or more interior recesses, extend from the recesses and channels to the component exterior at, for example, a component edge entry.

According to present aspects, channels in the form of passageways extending from recess-to-recess (e.g., connecting or interconnecting the recesses), and/or channels extending from a component exterior into one or more recesses, facilitate pressure standardization or equalization between, for example, ambient pressure outside of (e.g., exterior to) a component exterior (e.g. a machined material substrate exterior) and a pressure within a component interior (e.g., a machined substrate material interior) including, for example, a pressure in a sealed recess, or sealed internal pathway, etc. Such pressure equalization of the recesses and channels (forming the sealed internal pathway) with an exterior ambient pressure, increases the integrity of the composite material substrate and the component incorporating the composite material substrate, and can obviate buckling, bubbling, or other deformation of, for example, the top layer material adhered to the composite material substrate Ambient pressure refers to the exterior pressure to which the substrate material exterior is exposed. Ambient pressure is otherwise equivalently referred to herein as the exterior pressure present "outside" of the composite material substrate. According to present aspects, when the top layer material represents or contributes to an outer mold line, the potential for component surface deformation due to a pressure differential between the substrate material interior and substrate material exterior is significantly reduced or substantially obviated.

Still further, according to present aspects, the machining of channels into a composite material substrate that interconnect recesses formed in the composite material substrate, and that interconnect such recesses with a composite material exterior (for example, a composite material substrate first edge entry or composite material substrate second edge entry, etc.) facilitates the curing of the composite material substrate and/or the top layer material if the top layer material is a curable material such as, for example, a curable composite material. According to present aspects, to facilitate curing at a predetermined temperature (that can be, for example, an ambient temperature—also referred to as "room temperature"), composite material substrate first entry and/or composite material substrate second entry can be temporarily sealed, followed by applying a vacuum (e.g., negative pressure applied) to the recesse(s) and channel(s) located in the composite material substrate interior (e.g., the machined substrate material internal pathway).

The activated vacuum applies and maintains a negative pressure in the composite material substrate being cured, without the previously required presence of curing devices and apparatuses designed to encase an entire component or component region such as, for example, a curing "bag" that is often used in connection with vacuum bagging techniques. Obviating the need for bag curing apparatuses and procedures as well as potentially reducing the amount of heat provided for the curing regimen (due to the reduced pressure) reduces cost, decreases manufacturing costs and time, and streamlines and simplifies curing as well as overall production.

Further, present aspects contemplate making the curing of present composite material substrates at ambient temperatures possible, further obviating costs associated with large heating assemblies (e.g., ovens, etc.), and further reducing manufacturing cost and time, and increasing manufacturing flexibility, etc.

Components incorporating the composite material substrates described herein further overcome the problem of moisture accumulation occurring in one or more of the recesses. Further, if the presently disclosed composite material substrates are incorporated into, for example, an aircraft wing fuel tank assembly, a fuel leak could cause an unwanted accumulation of fuel in one or more recesses in the composite material substrate interior. According to this aspect, interconnecting the interior recesses with one another, and with a composite material edge entry can facilitate the purging or "clearing" of any contents or residuum that could otherwise accumulate with the recesses, as well as equalizing the pressures among the recesses, and establishing pressures within the recesses that approximates ambient pressure surrounding a component that comprises the present composite substrate materials having the recesses.

In addition, by providing an entryway or passageway from a component exterior into the component interior via the composite material substrate edge entries, visual inspection via optical filaments inserted into the recesses via the channels can be achieved for the purpose of, for example, conducting routine inspections, servicing, certification, etc.

FIG. 12 shows an overhead plan view of a machined material substrate 1200 with recesses 1204 machined into the material substrate 1202 in a predetermined pattern, and to a predetermined thickness, with individual recesses 1204 formed in the substrate such that according to present aspect, the recesses 1204 can be of a substantially uniform dimension. The material substrate that is formed into the machined material substrate (e.g., by machining the material substrate) can be a composite material substrate or a metal material substrate. The composite material substrate can be, for example, a fiber-containing epoxy-based composite material substrate, and can further be, for example, a carbon fiber-containing epoxy-based composite material substrate. The metal material substrate can be, for example, an aluminum alloy, including 2000 series and/or 7000 series aluminum alloys. Although not shown, according to a further aspect, the recesses can be formed such that the dimension of an individual recess changes, or the dimension of at least one of the recesses 1204 changes, relative to the rest of the recesses, and according to a predetermined regular or random pattern.

As further shown in FIG. 12, channels 1206 are machined into the material substrate 1202 to a predetermined distance (e.g., depth) from the substrate surface into the thickness of the substrate. The depth of the channels can be the same or different, and the depth of the channels can be equivalent to, less than, or greater than the depth of the recesses. According to present aspects, the channels can be machined into the substrate that can be a partially cured composite material in a manner similar to that illustrated in FIG. 6A and/or FIG. 6B and described herein. As further shown in FIG. 12, the material substrate 1202 has a material substrate first edge 1208 with a plurality of material substrate first edge entries 1209, and a material substrate second edge 1210 having a plurality of material substrate second edge entries 1211. As shown, a portion of a channel 1206 extends from a recess 1204 to either a material substrate first edge entry 1209 or a material substrate second edge entry 1211.

FIG. 13 is a cross-sectional side view of the material substrate shown in FIG. 12 and taken across line 13-13. As shown in FIG. 13, machined material substrate 1200, is shown having channels 1206 machined into the material substrate. FIG. 13 further shows a top layer 1212 that has been adhered or otherwise bonded in to place to cover the recesses and channels machined into the material substrate 1202. Such a top layer 1212 can be a composite material top layer disclosed herein, and of the type at least shown in FIG. 2A, 2B, 4F, 4G. According to further present aspects, the machined substrates shown in FIGS. 12 and 13 can be metal substrates, and the top layer as shown in FIG. 13 can be a metal material top layer. The composite material top layer can be, for example, a fiber-containing epoxy-based composite material substrate, and can further be, for example, a carbon fiber-containing epoxy-based composite material substrate. The top layer material can be, for example, an aluminum alloy, including 2000 series and/or 7000 series aluminum alloys.

FIGS. 14, 15, and 16 show a method of progressive steps for making the composite material substrate according to present methods, and similar to the manufacturing processes shown in FIGS. 4A through 4G. As shown in FIG. 14, initial stage 440A shows a molding tool 442 having a molding tool surface 442a, onto which is deposited (to a predetermined thickness) a predetermined amount of a material that can serve as a top layer material 448. Top layer material 448 can be a composite material top layer. Further the molding tool can include surface features introduced to the molding tool surface 442a that can be, for example, the geometry of an outer mold line that are transferred to an outer surface of the top layer during the formation of the top layer.

As shown in FIG. 15, second stage 400B shows molding tool 442 and top layer material 448 disposed on the molding tool 442 as shown in FIG. 14, with the addition of amounts of adhesive material 447 disposed onto the top layer material 448. The adhesive material can be disposed onto the top layer at regions that will avoid the regions where a recesses and channels have been machined into a composite material substrate that is to be brought into contact with the top layer.

As shown in FIG. 16, third stage 400C illustrates a machined material substrate 444 having a plurality of recesses 445 machined and channels machined (channels not shown in FIG. 16) into the material substrate, with the machined material substrate 444 disposed onto top layer material 448, and with top layer material 448 still disposed onto molding tool 442. The machined material substrate 444 contacts the adhesive material 447. The material assembly 450 that collectively comprises the material substrate 444 with the adhered top layer 448 can be referred to as a partially cured or curable composite material component assembly when one or more of the material substrate 444 with the adhered top layer 448 comprise curable composite materials.

As shown in FIG. 16, the adhesive material 447 has not been deposited at the locations on the top layer 448 where the recesses 445 in the composite material substrate 44 occur. That is, the adhesive material will bond the composite substrate material in the regions where material has not been machined to form recesses or channels. One or more of the material substrate that is formed into the machined material substrate 444 (e.g., by machining the material substrate) and the top layer can comprise a composite material or a metal material substrate of the types described herein.

Adhesive material 447 can comprise any adhesive or bonding material useful to bond the machined and at least partially cured composite top layer material 448 to the machined material substrate 444. According to present aspects the adhesive selected for use in the adhesive layer can be selected to be compatible with the substrate material and the top layer for the purpose of effected a predetermined bond as described herein. The composite material substrate, molding tool, and top layer can be of the type described herein and can include the materials described herein.

According to further present aspects, FIGS. 17 and 18 show a process for curing a material component assembly 450, wherein at least one of the machined material substrate 444 and the top layer material 448 includes a composite material. As shown at FIG. 17, fourth stage 400D shows a negative pressure being applied, for example, in the form of a vacuum, to internal pathways formed in the interior of the curable composite material component assembly in the form of recesses 445 and channels (machined channels not shown in FIG. 17) machined into the material substrate, and with the channels interconnecting the recesses 445. To facilitate curing by, for example, significantly reducing cure times and by reducing curing temperatures, a vacuum 464 including vacuum line 462 is directed to a material substrate manifold entry 460 that is shown in communication with a recess 445. Though not shown in FIG. 17, the material substrate manifold entry 460 could be in communication with a channel in place of a recess, or the material substrate manifold entry 460 could be in communication with both a recess and a channel.

As shown in FIG. 18, at fifth stage 400E, a vacuum bag is not employed to completely seal and cure the curable composite material that is present in the form of at least one of the machined material substrate 444 (e.g., a composite material substrate) or the top layer material 448 (e.g. a composite top layer material). Although not shown in FIG. 17, 18, or 19, if the machined material substrate 444 includes one or more material substrate first edge entries or one or more material substrate second edge entries (e.g., as shown in FIG. 12), the entries are temporarily blocked or otherwise sealed with a sealing apparatus. When the vacuum 464 is activated, a negative pressure is induced to the internal pathways in the interior of the curable composite material component assembly (as shown in FIGS. 17, 18), with the internal pathways in the form of recesses 445 and channels (machined channels not shown in FIG. 17 or 18) machined into the material substrate, and which interconnect the recesses 445. Arrows in FIG. 18 show the direction of air or other fluid being evacuated from the internal pathways of the interior of the material substrate component as negative pressure (e.g., a vacuum) is applied to the internal pathways.

According to further aspects, when the top layer is a composite material to be adhered or bonded to a machined metal substrate, the vacuum processes shown in FIGS. 17 and 18 can be used to accelerate the curing of the composite top layer. In addition, when the top layer material and machined substrate material are both made from a metal, the vacuum processes shown in FIGS. 17 and 18 can be used to vacuum bond the adhesive layer interposed between the metal top layer and machined metal substrate.

According to present aspects, external heating sources (not shown in FIG. 18) can be applied to the curable composite material component to complete the predetermined curing of a composite material substrate to form a cured composite material component 450' as shown in FIG. 19. The application of negative pressure to the curing system significantly reduces the amount of exterior heating that is required for curing composite materials that can be used as the machined material substrate (e.g., a machined composite material substrate) and/or the top layer material (e.g., the top layer composite material), further simplifying the curing regiment, and further reducing manufacturing cost as well as curing time. When the curing cycle is complete, the vacuum line is removed, any temporary sealing apparatuses used to form a closed circuit (e.g., by blocking the material substrate entries) is removed, and a cured composite material component 450' (that can be a cured composite material component, or a hybrid metal and cured composite component) is formed. When composite material are used for both the material substrate and the top layer, the cured composite material component 450' includes a cured composite material substrate 444' and a cured top layer 448'.

According to further aspects, when the machined substrate and/or the top layer comprise a metal material, aluminum alloys (e.g., 2000 series and/or 7000 series aluminum alloys) can be used to make the components having the machined recesses as shown, for example, in FIG. 19. Such metal components made according to presently disclosed methods to make presently disclosed components, subassemblies, and assemblies find particular utility for an improved manufacture of improved components for vehicles of the type referred to herein, including, for example, aircraft.

FIGS. 20 and 21 are flowcharts outlining methods according to present aspects. As shown in FIG. 20, a method is outlined including. As shown in FIG. 20, a method 300 according to present aspects is outlined including orienting 302 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 300 outlined in FIG. 20 further shows orienting 304 a separator layer onto the composite material substrate second surface. According to present aspects, the separator layer can be a caul plate or can be a film layer in combination with or otherwise integrating a release agent or release agent film. Method 300 as outlined in FIG. 20 further comprises orienting 306 a composite material top layer onto the separator layer, and bonding 308 the composite material substrate and the composite material top layer to form at least partially cured composite material top layer and an at least partially cured composite material substrate having an at least partially cured composite material substrate second surface. Present aspects contemplate composite material curing protocols (temperature/pressure/time/ramp ups/cool downs, etc.) consistent with accepted practice for curing epoxy-resin containing composite materials, including so-called "bag and cure" techniques, for example, with heating applied under vacuum. According to one non-limiting example, and according to one aspect, a carbon-fiber epoxy-based composite material can observe a cure cycle comprising a temperature ramp up to about 350° F. and a 2 hour hold at such temperature. According to tailored and predetermined curing cycles, for example, and potentially in consideration of available production time, etc., ramp rates held at temperatures lower than 350° F. can be observed to accommodate, for example, a predetermined resin flow of an adhesive material, etc. In addition, during processing of the disclosed components comprising the machined composite material substrates with recesses, evacuation of some or substantially all of the air from the recesses (equivalently referred to herein as "recess pockets") can be accomplished under vacuum that can be a vacuum used during curing, or can be an additional vacuum supplied prior to curing, etc.

Method 300 further includes separating 310 the composite material top layer from the composite material substrate layer. Method 300 further includes optionally removing the separator layer from the composite material substrate to expose the composite material substrate second surface. Method 300 further includes orienting 312 a material removal device proximate to the composite material substrate second surface. According to present aspects, and as disclosed above, the material removal device can be a CNC machine, a laser, a drill, or other mechanical cutting device, etc., or combinations thereof. Method 300 further includes machining 314 at least one recess into the composite material substrate that can be a partially cured composite substrate material, and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface. Method 300 further includes machining 316 at least one channel into the composite material substrate that can be a partially cured composite substrate material, and removing a predetermined amount of material from the composite material substrate to form at least one channel in the composite material substrate, with the channel configured to extend from the composite material second surface to a predetermined distance into the composite material substrate thickness to form a machined composite material substrate, and with the machined composite material substrate comprising a machined composite material substrate first surface and a machined composite material substrate second surface. The machined channels interconnect one or recess with other recesses to form an interior pathway in the composite material substrate. The channels can further be machined into the composite material substrate to form a pathway from a composite material substrate first and/or second edge (e.g., to first and/or second edge entries) into one or more recesses to form an interior pathway in the composite material substrate that is in communication with an environment that is external to or, "outside of" the interior of the composite material substrate.

As shown in FIG. 21, a method 400 according to present aspects is outlined including orienting 302 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 400 outlined in FIG. 21 further shows orienting 304 a separator layer onto the composite material substrate second surface. According to present aspects, the separator layer can be a caul plate or can be a film layer in combination with or otherwise integrating a release agent or release agent film. Method 400 as outlined in FIG. 21 further comprises orienting 306 a composite material top layer onto the separator layer, and at least partially curing 308 the composite material substrate and the composite material top layer to form at least partially cured composite material top layer and an at least partially cured composite material substrate having an at least partially cured composite material substrate second surface.

Method 400 further includes separating 310 the composite material top layer from the composite material substrate layer. Method 300 further includes optionally removing the separator layer from the composite material substrate to expose the composite material substrate second surface. Method 300 further includes orienting 312 a material removal device proximate to the composite material substrate second surface. According to present aspects, and as disclosed above, the material removal device can be a CNC machine, a laser, a drill, or other mechanical cutting device, etc., or combinations thereof. Method 400 further includes machining 314 at least one recess into the composite material substrate that can be a partially cured composite substrate material, and removing a predetermined amount of material from the composite material substrate to form a recess in the composite material substrate, with the recess configured to extend from the composite material second surface to a predetermined distance into the composite material substrate thickness to form a machined composite material substrate, and with the machined composite material substrate comprising a machined composite material substrate first surface and a machined composite material substrate second surface. Method 400 further includes machining 316 at least one channel into the composite material substrate that can be a partially cured composite substrate material, and removing a predetermined amount of material from the composite material substrate to form at least one channel in the composite material substrate, with the channel configured to extend from the composite material second surface to a predetermined distance into the composite material substrate thickness to form a machined composite material substrate, and with the machined composite material substrate comprising a machined composite material substrate first surface and a machined composite material substrate second surface. The machined channels interconnect one or more recesses with other recesses to form an interior pathway in the composite material substrate. The channels can further be machined into the composite material substrate to form a pathway from a composite material substrate first and/or second edge into one or more recesses to form an interior pathway in the composite material substrate that is in communication with an environment that is external to or, "outside of" the interior of the composite material substrate.

As shown in FIG. 21, method 400 further includes, applying 204 an adhesive material layer to at least one of the composite material top layer or the machined composite material substrate second surface, orienting 206 the composite material top layer onto the machined composite material substrate second surface, and bonding 208 the composite material top layer to the machined composite material substrate second surface.

Method 400 further includes sealing 402 a composite material substrate edge entry with, for example, a sealing apparatus that can include sealing plugs, sealing gaskets, sealing plates, or other suitable sealing apparatus. Method 400 further includes applying 404 a negative pressure to at least the composite material substrate interior by, for example, providing a vacuum, and curing 406 the composite material substrate that can form a cured composite material component.

According to further present aspects, the composite material substrate and the composite material top layer use the same molding tool to further streamline fabrication and ensures the integrity of mating surfaces and bonding surfaces between the composite material substrate and the composite material top layer. According to certain present aspects, the ability to manufacturer the 2-piece composite components according to present aspects, further reduces tooling expense and overall production cost, as fewer molding device need to be fabricated, stored, maintained, replaced set-up, etc.

According to further present aspects, one-piece composite components that formerly required complex multi-piece assemblies made from non-composite (e.g., significantly more dense and heavier materials—e.g., aluminum, titanium, etc.) can be made with presently disclosed internal pathways machined into a composite material substrate. The recesses and channels described herein can be machined into a composite material substrate that has been laid up on a molding tool (e.g., a mandrel), with the composite material laid up to a predetermined thickness. The laid up composite material substrate has a composite material first surface in contact with the molding tool, and a composite material substrate second surface that is exposed and that can be machined, preferably after the composite material substrate is at least partially cured. The composite material substrate is machined for the purpose of removing an amount of material from the composite material substrate at predetermined locations. The material removal results in at least one, or in a plurality of recesses and in at least one, or a plurality of channels being formed in the composite material substrate. As described herein, the recesses can be formed into any desired geometric shape and/or dimension, and can form a pattern of recesses. According to one aspect, the recesses can be interconnected via one or a plurality of channels that are also machined into the composite material substrate.

The channels and recesses can be machined into the composite material substrate to a desired thickness, as explained herein. The combination of interconnected recesses and channels (that can also be interconnected) form an internal pathway in the composite material substrate. Alternately, rather than removing material from a composite material substrate to form the recesses and/or channels in the material using material removal devices described herein, according to present aspects, the recesses and/or channels can be manufactured into the composite substrate material during manufacture of the composite material substrate (e.g., during layup, etc.).

According to present aspects, the side or surface of the composite material substrate that is to be machined is the surface that is not in contact with the molding tool. That is, according to this aspect, a first side or first surface of the composite material substrate (referred to herein as the composite material substrate first surface) contacts the molding tool, and the molding tool imparts tool surface features, dimensions, characteristics, etc. to the composite material substrate first surface. In this way, if the molding tool surface is dimensioned to impart, for example, an outer mold line (OML) to a molded surface, such OML is imparted or otherwise "transferred" to the composite material substrate first surface so molded by the molding tool.

In this aspect, a second composite component layer can be adhered (e.g., bonded, etc.) to the composite material substrate second surface (e.g., the surface that has been machined), such that the recesses and/or channels machined into the composite material substrate second surface are covered by the second composite material layer. When the second composite material is adhered in place, the internal pathway that has been machined into the composite material substrate is now a sealed internal pathway that is bounded by: 1) the recess walls and channel walls made from composite substrate material; and 2) the second composite material layer covering the recess and/or channels.

According to present aspects, multi-part assemblies can be made in a one-piece fabrication including, for example, the manufacture of composite material substrates into composite material parts (e.g., vehicle parts including, for example, aircraft component parts such as, for example, composite stringers, composite spars, composite ribs, composite outer wing skins, components for aircraft fuel tanks, etc.) that have the features, dimensions, structural performance, etc. of a quality that is at least equivalent to or even superior to the features, dimensions, structural performance, etc., of components that were previously manufactured from heavier materials. The present components made according to the methods, and assemblies comprising such components described herein, are durable, light-weight, etc., and when incorporated into larger structure such as, for example, a vehicle (e.g., aircraft, etc.) result in fuel savings, improved range, lower operating cost, etc.

In addition, the present composite components and present methods for making the composite components can dramatically reduce the cost of manufacturing wing assemblies, as there are no separate stringers or other structural reinforcing components required, as the structural requirements are machined into a one-piece component, obviating the many bonding or attachment processes formerly needed to bond together composite skins or other components to separate structural components e.g., stringers, spars, ribs etc.).

In the case of a wing assembly and components for wing assemblies in aircraft, the presently disclosed composite components can be used in such wing assemblies as skins, stringers, spars, upper panel vents in fuel tanks, etc. Further, in the composite components made according to present methods and aspects, the outer surface of the composite components (e.g., for a wing skin, etc.) can have an outer mold line, and the inner surface can be machined to include an internal pathway that can be useful in the distribution of fluids including, but not limited to fuel from, for example, upper panel vents in fuel tank assemblies located in an aircraft wing assembly. Such composite components made according to present aspects can be useful in the transport of, for example, fuel or other flowing liquid, with the recesses and interconnecting channels configured into fuel vent tubes, for example. As will be explained and shown in FIGs, the recesses and channels can be "closed" or "covered" or "sealed" with a composite material layer to form the internal pathways by "sealing" the internal pathways to form sealed internal pathways.

FIGS. 22-26 illustrate these aspects, in non-limiting fashion. FIG. 22 is a cross-sectional side view of a composite material substrate used to mold a second composite material layer. As shown in FIG. 22, a first assembly "stage" 2200 shows composite material substrate 2202 having a composite material substrate first surface 2202a and a composite material second surface 2202b. Composite material substrate 2202 as shown in FIG. 22 is in an at least partially cured state, having been removed from a mold (not shown in FIG. 22). If desired, a second composite material layer 2204 (having a second composite material first side or surface, and a second composite material layer second side or surface) can be layed up onto the composite material second surface 2202b such that the composite material substrate second surface 2202b contacts the second composite material layer first surface. The second composite material layer 2204 can be cured in place, and later removed from the composite material substrate using known release techniques that further employ a release layer, a release sheet, etc.

By using the composite material substrate second surface to mold the second composite material layer first side, an inner mold line (IML) can be imparted to the second composite material layer first side to facilitate an intimate "fit" when the second composite material layer is later placed into contact with the composite material substrate second surface.

FIG. 23 is a cross-sectional side view of a second assembly stage 2300, showing the parts presented in FIG. 22. As shown in FIG. 23 the second composite material layer 2204 (as shown in FIG. 22) has been at least partially cured to form an at least partially cured second composite material layer 2304 that has been removed from the composite material substrate second surface 2202b. The second composite material layer can be formed with intermediate release layers present (not shown).

FIG. 24 shows a third assembly stage 2400, with the composite material substrate second surface 2202b in the process of being machined to form the machined composite material substrate 2402 such that amounts of composite material are removed from the composite material substrate 2202 (shown in FIGS. 22 and 23) to form recesses 2045 having recess walls 2046, recess floors 2048, and a recess perimeter 2050 located at and bounded by the outer edge of the recess walls 2046 at the machined composite material substrate second surface 2402b (referred to equivalently herein as the recess "opening"). FIG. 24 further shows a first surface 2402a of the machined composite material substrate (referred to equivalently herein as the "machined" composite material substrate first surface 2402a), with the understanding that no actual machining occurs on the material substrate first surface 2402).

The machining of the recesses to a predetermined distance or depth into the thickness of the composite material substrate can be achieved according to methods and using equipment and techniques as set forth herein, and represented in FIG. 24 by the material removal device 2462. Though not shown in FIG. 23 or 24, channels can be machined to a predetermined distance or depth into the composite material substrate thickness as described herein. Such channels, can interconnect the recesses with one another, as the channels are machined into the composite material substrate second surface to intersect with and otherwise "breach" the recess walls for the purpose of interconnecting at least two recesses, or a plurality of recesses. In combination, the channels and the recesses together form a predetermined internal pathway (in an "open" or non-sealed condition) through the composite material substrate and at a predetermined thickness into the composite material substrate.

FIG. 25 shows a fourth assembly stage 2500 with the at least partially cured second composite material layer 2304 comprising at least partially cured second composite material layer first surface 2304a (referred to equivalently herein as "at least partially cured second composite material layer first side") and at least partially cured second composite material layer second surface 2304b (referred to equivalently herein as "at least partially cured second composite material layer second side"). As shown in FIG. 25, an adhesive layer 2447 has been applied to at least one of the second composite material layer first surface 2304a, or the machined composite material substrate second surface 2402b such that the adhesive layer (referred to equivalently herein as the bonding layer) 2447 is interposed between the second composite material layer first surface 2304a and the machined composite material substrate second surface 2402b.

As further shown in FIG. 25, in the area where the at least partially cured second composite material layer has been adhered to the machined composite material substrate second side, the recesses 2045 in combination with the channels (not shown) that are "covered" by the at least partially cured second composite material layer now form a sealed internal pathway 2510 to form a sealed composite material substrate 2502. The sealed internal pathway 2510 that comprises a plurality of recesses 2045 that can be interconnected, or otherwise placed into an open and flowing communication with one another via at least one channel or a plurality of channels (not shown in FIGS. 22-25) that interconnect the recesses. When channels have been machined into the composite material substrate second surface, the channels in combination with the interconnected recesses together form the sealed internal pathway 2510 in the formed sealed composite material substrate 2502.

The adhesive used to form the adhesive layer can be any adhesive as described herein. In addition, the curing protocols for the materials and parts shown in FIG. 25 can be conducted according to those protocols as set forth herein.

As shown in FIG. 26, the sealed composite material substrate 2502 (shown in FIG. 25) can be implemented, for example, as a one-piece part and incorporated as a component one-piece component (e.g., an upper panel vent grid) in an outer skin 2602 in a wing assembly 2600. The one-piece outer skin 2602, as shown in FIG. 26 comprises the sealed internal pathway 2510 that can be used to distribute or otherwise direct a flow of a fluid that is placed into communication with the sealed internal pathway 2510 including, for example, fuel, nitrogen, air, oxygen, or other desired liquid or gaseous material as desired from, for example, a fluid source (e.g., a fluid tank, fluid supply, etc.) to a destination including, for example, an engine intake, etc. If desired, the sealed internal pathway can itself act as an extension of, or a part of, a fluid supply or fluid source, such that, the sealed internal pathway can "hold" a supply of a fluid in a non-fluid-flowing state until a fluid flow through the sealed internal pathway is desired.

The sealed composite material substrate first surface 2602a, as shown in FIG. 26, incorporates the OML, as described herein. If desired, further present aspects are directed to the manufacture and use of one-piece composite parts having sealed internal pathways can further be incorporated into a location in a larger component where the sealed composite material second surface can comprise an inner mold line (IML). In this configuration, if desired) the second composite material can comprise an outer mold line (OML).

FIGS. 27 and 28 are flowcharts outlining methods according to present aspects. According to method 2700 outlined in FIG. 27, present aspects are directed to a method including orienting 2702 an amount of composite material onto a tool, with the tool having a tooling surface to form a composite material substrate (referred to equivalently herein as a first composite material substrate) having a first composite material substrate thickness with the first composite material substrate including a first composite material substrate first surface and first composite material substrate second surface, with the first composite material substrate second surface in contact with the tooling surface. The composite material substrate can be in the form of a plurality of composite material layers that can be an uncured or that can be in a partially cured state. The method 2700 further includes at least partially curing 2704 the first composite material substrate, followed by machining 2706 at least one recess into the first composite material substrate second surface to form a machined composite material substrate, with the at least one recess machined into the composite material substrate to a desired depth or distance from the at least partially cured composite material substrate second surface into the thickness of the at least partially cured composite material substrate. The machining of the composite material substrate second surface can occur while the at least partially cured composite material substrate is retained in the tool (equivalently referred to herein as the "mold") or the at least partially cured composite material substrate can be removed from the tool and otherwise secured for further processing in the form of material removal from the composite material substrate second surface, with the material removal coming within the definition of "machining" according to present aspects, and with the machining (e.g., material removal) methods including those described herein.

Method 2700, as shown in FIG. 27 further includes providing 2708 a second composite material layer (referred to equivalently herein as the "composite material layer"), with the second composite material layer having a composite material layer first surface and a second composite material layer second surface. According to present aspects the (first) composite material substrate and the second composite material layer can be made from the same or different composite materials. Method 2700 further includes applying 2710 an amount of adhesive material to at least one of the machined composite material substrate second surface and/or the second composite material layer first surface followed by orienting 2712 the second composite material layer first surface onto the machined composite material substrate second surface to form a composite material component, with the composite material component now including a least one internal pathway, and bonding 2714 the second composite material layer first surface onto the machined composite material substrate second surface to form a composite material component having at least one sealed internal pathway.

FIG. 28 is a flowchart outlining a present aspect. As shown in FIG. 28, method 2800 includes the steps presented and described herein for method 2700 and as shown in FIG. 27, with the additional steps of forming 2802 an outer mold line (OML) on the first composite material substrate first surface. The dimensions of the OML are, according to present aspects, "transferred" from the tooling surface (that also possesses the dimensions of the OML) to the composite material substrate first surface that is in contact with the tooling surface of the tool. Method 2800 further includes machining 2804 at least one channel into the at least partially cured first composite material substrate second surface to a predetermined depth or distance from the at least partially cured first composite material substrate second surface into the thickness of the at least partially cured first composite material substrate, with the material removal coming within the definition of "machining" according to present aspects, and with the machining (e.g., material removal) methods to form the channels including those described herein and that can also be used to machine the recesses.

According to further present aspects, the composite material substrate and the composite material top layer use the same molding tool to further streamline fabrication and ensures the integrity of mating surfaces and bonding surfaces between the composite material substrate and the composite material top layer. According to certain present aspects, the ability to manufacturer the 2-piece composite components according to present aspects, further reduces tooling expense and overall production cost, as fewer molding device need to be fabricated, stored, maintained, replaced set-up, etc.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method for forming a composite material component, said method comprising:
    orienting a plurality of composite material layers onto a tool to form a first composite material substrate, said first composite material substrate comprising a first composite material substrate thickness, said tool comprising a tooling surface, and said first composite material substrate further comprising:
        a first composite material substrate first surface, said first composite material substrate first surface positioned in contact with the tooling surface;
        a first composite material substrate second surface, said first composite material substrate second surface comprising an inner mold line;
    providing a second composite material substrate to the first composite material substrate second surface, said second composite material substrate comprising a second composite material substrate first surface and a second composite material substrate second surface, said second composite material substrate first surface configured to contact said first composite material substrate second surface;
    imparting said inner mold line from the first composite material substrate second surface to said second composite material substrate first surface;
    removing said second composite material substrate from said first composite material substrate second surface;
    at least partially curing the first composite material substrate;
    machining a plurality of recesses into the first composite material substrate second surface, said plurality of recesses configured to extend from the first composite material second surface to a predetermined distance into the first composite material substrate thickness to form a machined composite material substrate, said machined composite material substrate comprising a machined composite material substrate first surface and a machined composite material substrate second surface, said plurality of recesses each comprising a recess perimeter at the machined composite substrate material second surface;
    machining at least one channel into the first composite material substrate second surface, said at least one channel configured to intersect a plurality of recesses;
    orienting the second composite material substrate first surface onto the machined composite material substrate second surface;
    bonding the second composite material substrate first surface to the machined composite material substrate second surface to form a composite material component, said composite material component comprising at least one internal pathway;
    wherein said at least one internal pathway is bounded by the machined composite material substrate and the second composite material substrate first surface; and
    wherein said at least one internal pathway comprises a plurality of interconnected recesses.

2. The method of claim 1, wherein the tooling surface comprises an outer mold line dimension, said method further comprising:
    forming the outer mold line dimension in the first composite material substrate first surface.

3. The method of claim 1, wherein
    said at least one channel is configured to intersect more than two recesses.

4. The method of claim 1, wherein at least one of the plurality of recesses comprises a geometric profile, said geometric profile comprising: at least one of a rectangle, a circle, an ellipse, a triangle, a polygon, an irregular shape, and combinations thereof.

5. The method of claim 1, wherein the predetermined distance is equal to from about 10% to about 90% of the first composite material substrate thickness.

6. The method of claim 1, wherein the predetermined distance is equal to from about 50% to about 80% of the first composite material substrate thickness.

7. The method of claim 1, wherein the plurality of recesses are machined into the first composite material substrate in a predetermined pattern.

8. The method of claim 1, wherein before the step of bonding the second composite material layer to the to the machined composite material substrate second surface to form a composite material component, the method further comprising:

applying an adhesive material to at least one of the machined composite substrate material second surface, the recess perimeter, and the second composite material substrate first surface.

9. The method of claim 1, wherein said at least one internal pathway comprises at least one channel intersecting the plurality of interconnected recesses.

10. The method of claim 1, wherein said at least one internal pathway comprises a plurality of channels intersecting the plurality of interconnected recesses.

11. The method of claim 1, wherein the at least one internal pathway comprises at least one sealed internal pathway.

12. The method of claim 9, wherein said at least one internal pathway comprises a sealed internal pathway.

13. The method of claim 10, wherein said at least one internal pathway comprises a sealed internal pathway.

* * * * *